United States Patent
Ko et al.

(10) Patent No.: US 9,898,775 B2
(45) Date of Patent: Feb. 20, 2018

(54) METHOD AND SYSTEM FOR PROVIDING INFORMATION BY USING STORE TERMINAL

(71) Applicant: SAMSUNG ELECTRONICS CO., LTD., Suwon-si (KR)

(72) Inventors: Jae-woo Ko, Uiwang-si (KR); Hee-won Jung, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 13/975,628

(22) Filed: Aug. 26, 2013

(65) Prior Publication Data

US 2014/0058891 A1   Feb. 27, 2014

(30) Foreign Application Priority Data

Aug. 24, 2012 (KR) .................. 10-2012-0093290

(51) Int. Cl.
| | |
|---|---|
| G06Q 30/00 | (2012.01) |
| G06Q 30/06 | (2012.01) |
| G06Q 10/00 | (2012.01) |

(52) U.S. Cl.
CPC ......... *G06Q 30/0633* (2013.01); *G06Q 10/00* (2013.01); *G06Q 30/00* (2013.01)

(58) Field of Classification Search
CPC .................................................. G06Q 30/0633
USPC ...................................................... 705/26.8
See application file for complete search history.

(56) References Cited

U.S. PATENT DOCUMENTS

| | | | |
|---|---|---|---|
| 6,725,206 B1* | 4/2004 | Coveley ..................... 705/414 |
| 7,962,315 B2 | 6/2011 | Jensen et al. | |
| 2003/0144793 A1* | 7/2003 | Melaku ............... G01C 21/206 701/434 |
| 2005/0258975 A1* | 11/2005 | Hunt ........................ 340/686.1 |
| 2007/0143188 A1* | 6/2007 | Kelley et al. .................. 705/26 |
| 2008/0189170 A1* | 8/2008 | Ramachandra .... G06Q 30/0201 705/7.29 |
| 2008/0231432 A1* | 9/2008 | Stawar et al. ............ 340/425.5 |
| 2009/0140046 A1 | 6/2009 | Landers, Jr. et al. | |

(Continued)

FOREIGN PATENT DOCUMENTS

| | | |
|---|---|---|
| CN | 101901437 A | 12/2010 |
| JP | 2005-173842 A | 6/2005 |

(Continued)

OTHER PUBLICATIONS

Fraser, James, Retail Goes Digital, Feb. 2010, Ensemble IQ, 124.1, pp. 37, 39, 41 (Year: 2010).*

(Continued)

*Primary Examiner* — Brandy A Zukanovich
*Assistant Examiner* — Brittney N Miller
(74) *Attorney, Agent, or Firm* — Sughrue Mion, PLLC

(57) ABSTRACT

Provided are a method and system for providing information by using a store terminal. A method performed by a mobile terminal to receive information about goods, the method may include storing a first list of goods from a store; receiving, from the store terminal, a second list of goods confirmed by a store terminal; and displaying goods included in the stored first list and goods included in the second list. The goods listed on the second list may be confirmed by the store terminal to be contained in a shopping cart of a user.

17 Claims, 16 Drawing Sheets

(56) References Cited

U.S. PATENT DOCUMENTS

2009/0140850 A1    6/2009  Kangas et al.
2010/0072715 A1*  3/2010  Crum
2010/0106602 A1*  4/2010  Fuzell-Casey et al. ... 705/14.58
2011/0288906 A1*  11/2011  Thomas et al. ............. 705/7.29
2013/0007728 A1*  1/2013  Oh et al. ...................... 717/178

FOREIGN PATENT DOCUMENTS

| | | |
|---|---|---|
| JP | 2011-100280 A | 5/2011 |
| KR | 10-2005-0026138 A | 3/2005 |
| KR | 10-2007-0021346 A | 2/2007 |
| KR | 10-2011-0130078 A | 12/2011 |
| WO | 2009/064206 A2 | 5/2009 |
| WO | WO 2012166233 A1 * | 12/2012 |

OTHER PUBLICATIONS

Communication, dated Nov. 29, 2013, issued by the European Patent Office in counterpart European Application No. 13181541.7.
International Search Report, dated Dec. 10, 2013, issued by the International Searching Authority in counterpart International Application No. PCT/KR2013/007574.
Communication dated Sep. 13, 2016 issued by the European Patent Office in counterpart European Patent Application No. 13 181 541.7.
Communication dated Jan. 26, 2017 issued by The State Intellectual Property Office of P.R. China in counterpart Chinese Patent Application No. 201380044285.2.

* cited by examiner

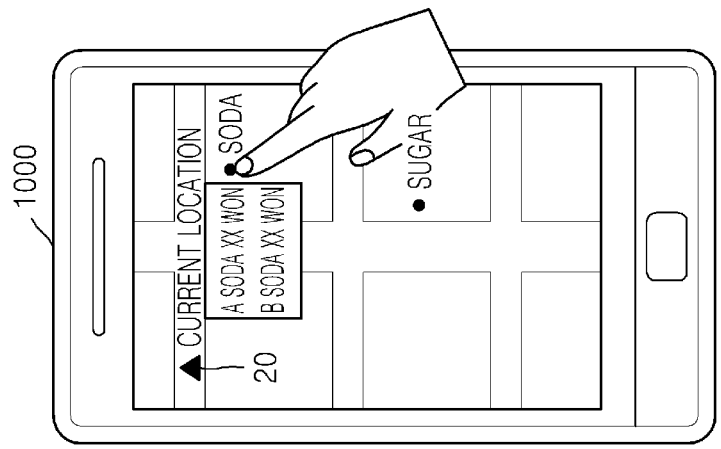
FIG. 11A
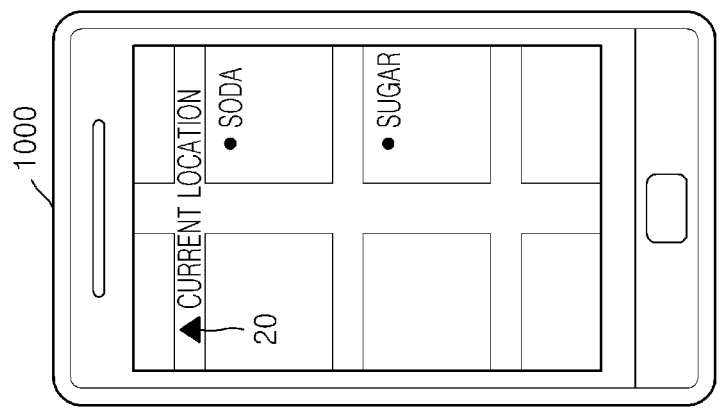
FIG. 11B
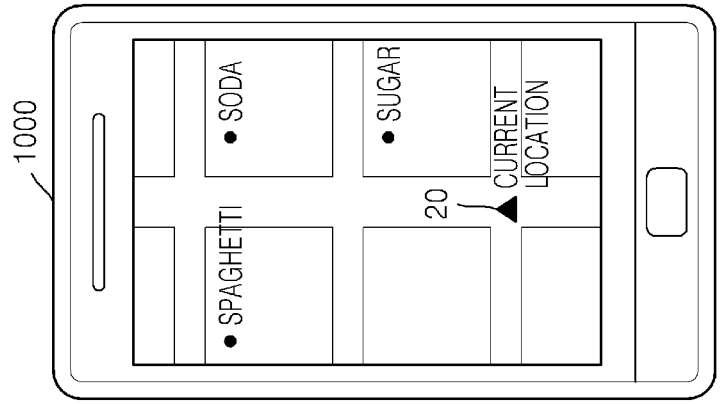
FIG. 11C

METHOD AND SYSTEM FOR PROVIDING INFORMATION BY USING STORE TERMINAL

CROSS-REFERENCE TO RELATED PATENT APPLICATION

This application claims priority from Korean Patent Application No. 10-2012-0093290, filed in the Korean Intellectual Property Office on Aug. 24, 2012, the disclosure of which is incorporated herein by reference in its entirety.

BACKGROUND

1. Field

Apparatuses and methods consistent with exemplary embodiments relate to a system and method, and more particularly, to a system and method for providing information about goods by using a store terminal.

2. Description of the Related Art

With the advances in communication technology and multimedia technology it has become possible for a user to use a mobile terminal to access various services. For example, when the user comes to a store, the user can access various services provided by the store through their mobile terminal.

However, it may be difficult for the user to install an application for using a service provided by the store on the mobile terminal. It may also be difficult for the mobile terminal to efficiently obtain and synchronize various pieces of information provided by the store to use the service provided by the store.

SUMMARY

According to an aspect of an exemplary embodiment, there is provided a method performed by a mobile terminal to receive information about goods, the method including: storing a first list of goods from a store; receiving, from a store terminal, a second list of goods confirmed by a store terminal; and displaying the goods included in the stored first list and the goods included in the second list, wherein the goods listed on the second list are confirmed by the store terminal to be contained in a shopping cart of a user.

The method may further include receiving, from a server of the store, location information about locations in the store of the goods included in the first list.

The method may further include: receiving store map information from the server, wherein the displaying of the goods includes: displaying a store map on a screen of the mobile terminal and displaying the goods included in the first list on the store map, based on the received store map information and the received location information.

The displaying of the goods may further include: distinctively displaying, on the store map, the goods included in the second list from the goods included in the first list.

The method may further include: receiving, from a server of the store, event information about goods included in the first list that are not included in the second list.

The first list may be provided from the store terminal to the server.

The location information may be about goods included in the first list that are not confirmed by the store terminal.

The second list of the goods confirmed by the store terminal may be provided by the store terminal to the server.

The shopping cart may include the store terminal.

The store terminal may confirm the goods contained in the shopping cart by using a plurality of near field communication (NFC) tags included in the shopping cart.

The method may further include: requesting a server of the store process payment of the goods included in the second list, wherein payment completion information indicating that the goods are paid for is provided to the store terminal in response to the goods being paid.

The payment completion information may be used by the store terminal to change the right to pass a gate of the store.

When the mobile terminal and the store terminal approach each other, the method may further include: transmitting terminal information of the mobile terminal to the store terminal; receiving, from the store terminal, application information based on the terminal information; and installing an application for using a service provided from a server of the store based on the received application information.

The terminal information may include at least one of an identification value of the mobile terminal and a type of operating system (OS) installed in the mobile terminal, wherein the application information is information about an application corresponding to at least one of the identification value and the OS of the mobile terminal.

The application information may include at least one of an application installation file and link information for downloading the application installation file.

According to another aspect of an exemplary embodiment, there is provided a method performed by a store terminal to provide information about goods, the method including: confirming goods contained in a shopping cart; providing a second list of the confirmed goods to a mobile terminal as the store terminal and the mobile terminal approach each other; distinguishing the goods included in the second list from goods included in a first list of a user.

According to another aspect of an exemplary embodiment, there is provided a method performed by a server to provide information about goods, the method including: receiving, from a store terminal, a first list of a user for goods; receiving, from the store terminal, a second list of goods contained in a shopping cart; providing, to a mobile terminal of the user, location information about locations in a store of goods included in the first list; and providing, to the mobile terminal, event information about goods not included in the second list received from the store terminal from among the goods included in the first list.

According to another aspect of an exemplary embodiment, there is provided a mobile terminal including: a second list confirming unit configured to receive, from a store terminal, a second list of goods confirmed by the store terminal; and a purchase information display unit configured to display goods included in a first list of a user, and configured to display the goods included in the second list received from the store terminal, wherein the goods listed on the second list are confirmed by the store terminal to be contained in a shopping cart of the user.

The mobile terminal may further include: a goods information receiving unit configured to receive, from a server of the store, location information about locations in the store of the goods included in the first list.

The mobile terminal may further include: a store information receiving unit configured to receive store map information from the server, wherein the purchase information display unit is further configured to display a store map on a screen of the mobile terminal and displays the goods included in the first list on the store map, based on the received store map information and the received location information.

The purchase information display unit may be further configured to distinctively display, on the store map, the goods included in the second list from the goods included in the first list.

The goods information receiving unit may be further configured to receive, from the server of the store, event information about goods included in the first list that are not included in the second list.

The first list may be provided from the store terminal to the server.

The location information may be about goods included in the first list that are not confirmed by the store terminal.

The second list of the goods confirmed by the store terminal may be provided by the store terminal to the server.

The shopping cart may include the store terminal.

The store terminal may be configured to confirm the goods contained in the shopping cart by using a plurality of near field communication (NFC) tags included in the shopping cart.

The mobile terminal may further including: a payment unit configured to request a server of the store process payment of the goods included in the second list, wherein payment completion information indicating that the goods are paid for is provided to the store terminal in response to the good being paid.

The payment completion information may be used by the store terminal to change the right to pass a gate of the store.

The mobile terminal may further include: a terminal information providing unit configured to, as the mobile terminal and the store terminal approach each other, transmit terminal information of the mobile terminal to the store terminal; an application information receiving unit configured to receive, from the store terminal, application information based on the terminal information; and an application installing unit configured to install an application for using a service provided from a server of the store based on the received application information.

The terminal information may include at least one of an identification value of the mobile terminal and a type of operating system (OS) installed in the mobile terminal, and wherein the application information is information about an application corresponding to at least one of the identification value and the OS of the mobile terminal.

The application information may include at least one of an application installation file and link information for downloading the application installation file.

According to another aspect of an exemplary embodiment, there is provided a store terminal including: a goods confirming unit configured to confirm goods contained in a shopping cart; and a second list providing unit configured to provide a second list of the confirmed goods to a mobile terminal as the store terminal and the mobile terminal approach each other, wherein the goods included in the second list are distinguished from goods included in a first list of a user for goods in a store.

According to another aspect of an exemplary embodiment, there is provided a server including: a first list receiving unit configured to receive, from a store terminal, a first list of a user for goods; a goods confirming unit configured to receive, from the store terminal, a second list of goods contained in a shopping cart; and a goods information providing unit configured to provide, to a mobile terminal of the user, location information about locations in a store of goods included in the first list, and configured to provide, to the mobile terminal, event information about goods not included in the second list received from the store terminal from among the goods included in the first list.

According to an aspect of another exemplary embodiment, there may be provided a non-transitory computer-readable recording medium having embodied thereon a program for executing the method of the first aspect.

According to an aspect of another exemplary embodiment, there may be provided a non-transitory computer-readable recording medium having embodied thereon a program for executing the method of the second aspect.

According to an aspect of another exemplary embodiment, there may be provided a non-transitory computer-readable recording medium having embodied thereon a program for executing the method of the third aspect.

BRIEF DESCRIPTION OF DRAWINGS

The above and other features and advantages of one or more exemplary embodiments will become more apparent by describing in detail exemplary embodiments thereof with reference to the attached drawings in which:

FIGS. 11A-11C illustrate views for explaining a process where a mobile terminal displays locations of goods that a user may purchase on a store map, according to an exemplary embodiment;

DETAILED DESCRIPTION

Figure 1:
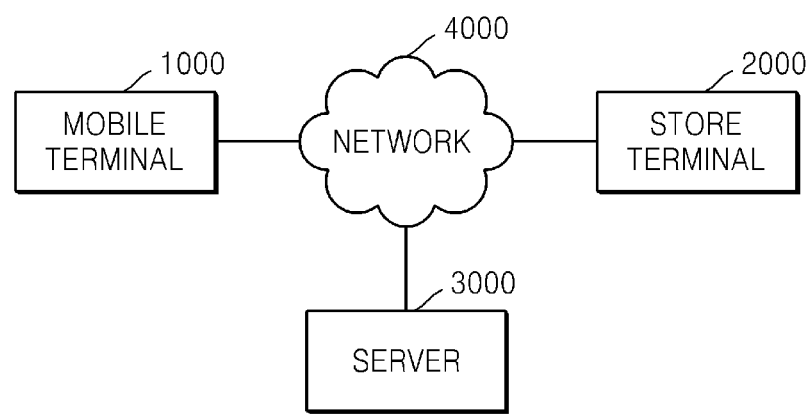
FIG. 1 is a block diagram illustrating a system for providing information by using a store terminal, according to an exemplary embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a particular order. In addition, respective descriptions of well-known functions and constructions may be omitted for increased clarity and conciseness.

Expressions such as "at least one of," when preceding a list of elements, modify the entire list of elements and do not modify the individual elements of the list.

One or more exemplary embodiments will now be described more fully with reference to the accompanying drawings for those of ordinary skill in the art to be able to perform one or more exemplary embodiments without difficulty. One or more exemplary embodiments may, however, be embodied in many different forms and should not be construed as being limited to the embodiments set forth herein; rather, these embodiments are provided so that this disclosure will be thorough and complete, and will fully convey the concept to those of ordinary skill in the art. Also, parts in the drawings unrelated to the detailed description are omitted to ensure clarity. Like reference numerals in the drawings denote like elements, and thus their description will not be repeated.

Throughout the specification, it will be understood that when an element is referred to as being "connected" to another element, it may be "directly connected" to the other element or "electrically connected" to the other element with intervening elements there between. It will be further understood that when a part "includes" or "comprises" an element, unless otherwise defined, the part may further include other elements, not excluding the other elements.

The term " . . . unit" used in the embodiments indicates a component including software or hardware, such as a Field Programmable Gate Array (FPGA) or an Application-Specific Integrated Circuit (ASIC), and the " . . . unit" performs certain roles. However, the " . . . unit" is not limited to software or hardware. The " . . . unit" may be configured to be included in an addressable storage medium or to reproduce one or more processors. Therefore, for example, the " . . . unit" includes components, such as software components, object-oriented software components, class components, and task components, processes, functions, attributes, procedures, subroutines, segments of program code, drivers, firmware, microcode, circuits, data, a database, data structures, tables, arrays, and variables. A function provided inside components and " . . . units" may be combined into a smaller number of components and " . . . units", or further divided into additional components and " . . . units".

The term "module" as used herein means, but is not limited to, a software or hardware component, such as an FPGA or ASIC, which performs certain tasks. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Although the terms used herein are generic terms which are currently widely used and are selected by taking into consideration functions thereof, the meanings of the terms may vary according to the intentions of persons skilled in the art, legal precedents, or the emergence of new technologies. Furthermore, some specific terms may be randomly selected by the applicant, in which case the meanings of the terms may be specifically defined in the description of the exemplary embodiment. Thus, the terms should be defined not by simple appellations thereof but based on the meanings thereof and the context of the description of the exemplary embodiment. As used herein, expressions such as "at least one of," when preceding a list of elements, modify the entire list of elements and do not modify the individual elements of the list.

It will be understood that when the terms "includes," "comprises," "including," and/or "comprising," when used in this specification, specify the presence of stated elements and/or components, but do not preclude the presence or addition of one or more elements and/or components thereof. As used herein, the term "module" refers to a unit that can perform at least one function or operation and may be implemented utilizing any form of hardware, software, or a combination thereof.

One or more exemplary embodiments will now be described more fully with reference to the accompanying drawings, in which the exemplary embodiments are shown.

FIG. 1 is a block diagram illustrating a system for providing information by using a store terminal 2000, according to an exemplary embodiment.

Referring to FIG. 1, the system includes a mobile terminal 1000, the store terminal 2000, a server 3000, and a network 4000.

The mobile terminal 1000 may install an application for using a server provided by a store based on application information provided from the store terminal 2000, and may distinctively display goods included in a wish list, or first list, of a user for goods and goods contained in a shopping cart by using the installed application. Also, the mobile terminal 1000 may facilitate payment of the goods contained in the shopping cart along with the server 3000 of a store.

The mobile terminal 1000 may provide terminal information to the store terminal 2000 through the network 4000, and may install the application therein based on the application information received from the store terminal 2000. The application information may include at least one of an application installation file for using the service provided by the store and link information for downloading the application.

Also, the mobile terminal 1000 may provide information about the wish list for the goods to the store terminal 2000, and may receive a goods list, or second list, of the goods contained in the shopping cart from the store terminal 2000. Also, the mobile terminal 1000 may receive from the server 3000 information about the goods included in the wish list and information about the goods contained in the shopping cart, and may distinctively display the goods included in the wish list and the goods contained in the shopping cart on a screen of the mobile terminal 1000.

The store terminal 2000 may provide the application information to the mobile terminal 1000, and may generate the goods list of the goods contained in the shopping cart and provide the goods list to the mobile terminal 1000 and the server 3000. Also, when the goods contained in the shopping cart are paid for, the store terminal 2000 may change a right to passage for a gate of the store which provides an exit for the user and purchased goods.

The store terminal 2000 may provide the application information corresponding to the mobile terminal 1000 to the mobile terminal 1000 based on terminal information received from the mobile terminal 1000. The store terminal 2000 may provide the application information suitable for the mobile terminal 1000 to the mobile terminal 1000 based on a type of the mobile terminal 1000 and an operating system (OS) installed on the mobile terminal 1000.

Also, the store terminal 2000 may generate the goods list of the goods contained in the shopping cart based on information received from tags attached to goods. Also, the store terminal 2000 may be included in the shopping cart of the store, but the present embodiment is not limited thereto.

The server 3000 may provide to the mobile terminal 1000 the information about the goods included in the wish list and the goods contained in the shopping cart, and may facilitate payment of the goods contained in the shopping cart along with the mobile terminal 1000. The information about the goods may include information about names of the goods, prices of the goods, events about the goods, and locations of the goods. Also, the server 3000 may provide store map information to the mobile terminal 1000. The server 3000 may provide payment completion information indicating that the goods contained in the shopping cart are paid for to both the mobile terminal 1000 and the store terminal 2000.

The network 4000 may be a wired network, such as a local area network (LAN), a wide area network (WAN), or a value added network (VAN), or a wireless network, such as a mobile radio communication network, near field communication (NFC), or a satellite communication network. Also, the network 4000 may be any data communication network, in a broad sense, in which network components may smoothly communicate with one another. Examples of the network 4000 may include wired Internet, wireless Internet, and a mobile wireless communication network.

Figure 2:
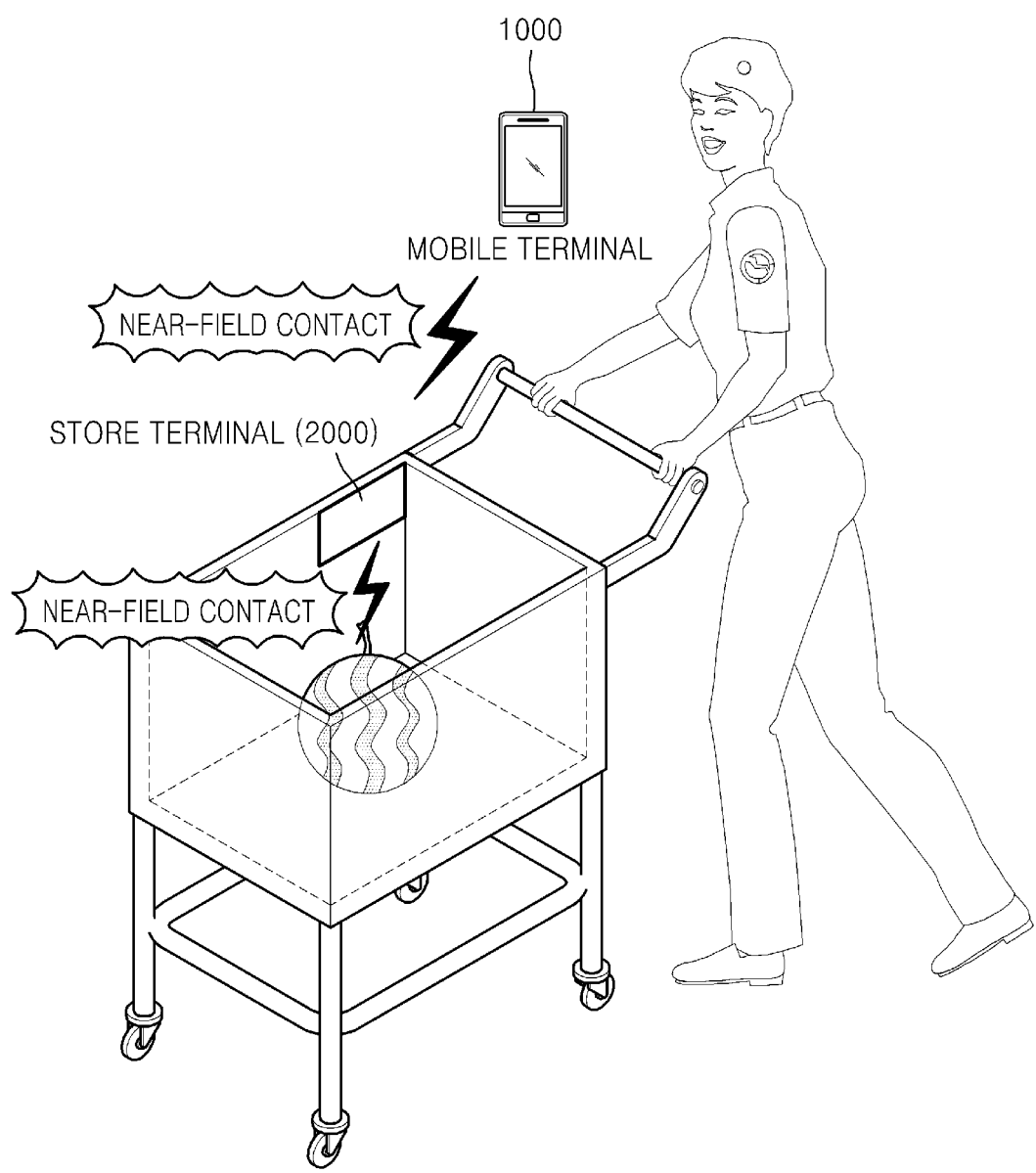
FIG. 2 is a view for explaining a process where a mobile terminal of a user who comes to a store transmits/receives information to/from a store terminal, according to an exemplary embodiment.

FIG. 2 is a view for explaining a process where a mobile terminal 1000 of the user, for example, such as the mobile terminal 1000 of FIG. 1, transmits/receives information to/from a store terminal (2000), for example the store terminal 2000 of FIG. 1, according to an exemplary embodiment.

Referring to FIG. 2, the mobile terminal 1000 may provide the terminal information via NFC to the store terminal 2000 and may receive the application information from the store terminal 2000. The mobile terminal 1000 may install the application for using the service provided by the store based on the received application information.

Also, the mobile terminal 1000 may provide the wish list of the user containing the goods to the store terminal 2000 via NFC, and may receive the shopping cart list that contains the goods list of the goods contained in the shopping cart from the store terminal 2000.

In this case, the store terminal 2000 may be attached to a predetermined location of the shopping cart or may be included in the shopping cart, and may receive the information about the goods via NFC from tags attached to the goods. Also, the store terminal 2000 may generate the shopping cart list based on the information received from the tags attached to the goods.

Particularly, according to an exemplar embodiment, as the user brings the tags attached to the goods toward the store terminal 2000, the store terminal 2000 may receive the information about the goods from the tags attached to the goods, but the present embodiment is not limited thereto. A plurality of sensors or NFC readers may be located on the shopping cart, and the store terminal 2000 may generate the goods list of the goods contained in the shopping cart based on the goods information obtained from the plurality of sensors or the NFC readers.

Figure 3:
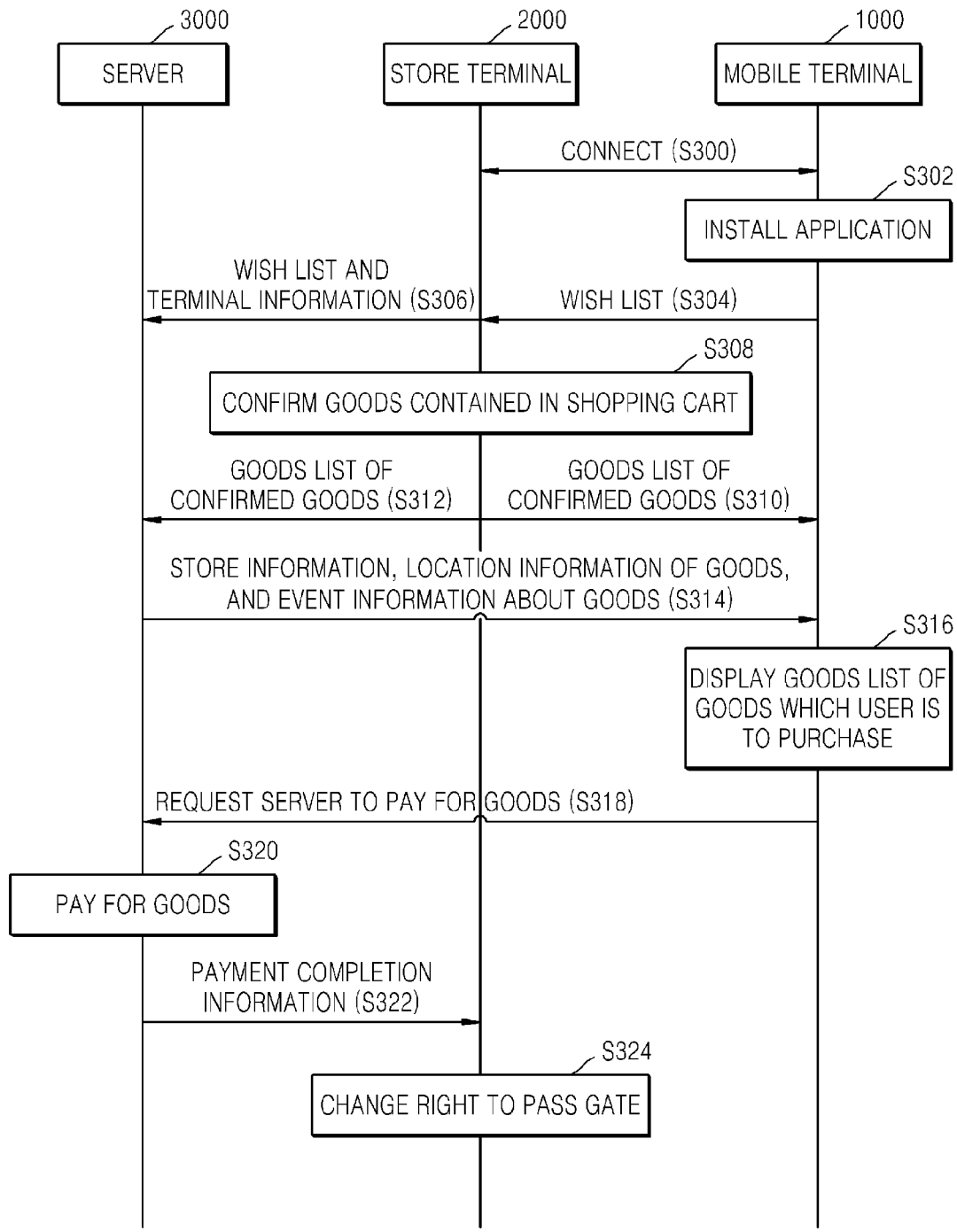
FIG. 3 is a flowchart illustrating a method where a mobile terminal receives information about goods from a store terminal and a server, according to an exemplary embodiment.

FIG. 3 is a flowchart illustrating a method where a mobile terminal 1000 receives the information about the goods from the store terminal 2000 and the server 3000, according to an exemplary embodiment.

In operation S300, the mobile terminal 1000 and the store terminal 2000 are connected to each other. When the user brings the mobile terminal 1000 to a position within a predetermined distance from the store terminal 2000, the mobile terminal 1000 and the store terminal 2000 may be connected to each other via NFC.

Also, the mobile terminal 1000 and the store terminal 2000 may transmit/receive predetermined information. As the mobile terminal 1000 and the store terminal 2000 approach each other, the mobile terminal 1000 may provide terminal information to the store terminal 2000. The terminal information may include, for example, information about a type of the mobile terminal 1000, a specification of the mobile terminal 1000, a type of OS installed in the mobile terminal 1000, and connection information for communicating with the mobile terminal 1000.

Also, as the mobile terminal 1000 and the store terminal 2000 approach each other, the store terminal 2000 may provide the application information to the mobile terminal 1000. The application information, which is information about the application for using the service provided by the store, may include, for example, link information for downloading an application installation file, and the application installation file. Also, the store terminal 2000 may provide the application information suitable for the mobile terminal 1000 to the mobile terminal 1000 based on the terminal information.

Also, the mobile terminal 1000 and the store terminal 2000 may transmit/receive information with respect to each other via other communication means, instead of NFC. In this case, the mobile terminal 1000 and the store terminal 2000 may transmit/receive connection information for using other communication means via NFC, and may transmit/receive the terminal information and the application information via the other communication means by using the transmitted/received connection information. For example, the mobile terminal 1000 and the store terminal 2000 may transmit/receive information via wireless fidelity (WiFi) communication. However, the present embodiment is not limited thereto, and examples of the other communication means may include WiFi communication, 3rd generation (3G) communication, $4^{th}$ generation (4G) communication, and Bluetooth communication.

In operation S302, the mobile terminal 1000 installs the application for using the service provided by the store. The mobile terminal 1000 may install the application for using the service provided by the store based on the application information received from the store terminal 2000. When the mobile terminal 1000 receives an application installation file from the store terminal 2000, the mobile terminal 1000 may install the application by using the application installation file. Also, when the mobile terminal 1000 receives link information for downloading the application installation file, the mobile terminal 1000 may download the application installation file by using the link information and may install the application.

In operation S304, the mobile terminal 1000 provides the wish list of the user to the store terminal 2000. The mobile terminal 1000 may generate and store the user wish list based on the user's input. Also, as the mobile terminal 1000 approaches the store terminal 2000, the mobile terminal 1000 may provide the wish list to the store terminal 2000 via NFC. However, the present embodiment is not limited thereto, and the mobile terminal 1000 may provide the wish list to the store terminal 2000 via WiFi communication.

In operation S306, the store terminal 2000 provides the wish list and the terminal information of the mobile terminal 1000 to the server 3000. The store terminal 2000 may provide the wish list and the terminal information received from the mobile terminal 1000 to the server 3000.

Although the mobile terminal 1000 provides the terminal information and the wish list to the store terminal 2000 and the store terminal 2000 provides the terminal information and the wish list to the server 3000 in FIG. 3, the present embodiment is not limited thereto. The mobile terminal 1000 may receive connection information about the server 3000 from the store terminal 2000, and the server 3000 may be directly provided the terminal information and the wish list from the mobile terminal 1000.

In operation S308, the store terminal 2000 confirms the goods contained in the shopping cart. The store terminal 2000 may confirm the goods contained in the shopping cart by receiving the information about the goods from the tags attached to the goods. For example, when the user brings the goods that are to be purchased in the store toward the store terminal 2000, the store terminal 2000 may receive the information about the goods from the tags attached to the goods via NFC.

Also, the store terminal 2000 may confirm the goods contained in the shopping cart by using the plurality of sensors and NFC readers located on the shopping cart. In this case, the plurality of sensors and NFC readers may be uniformly located on the shopping cart, and may obtain the information about the goods contained in the shopping cart. Also, the store terminal 2000 may confirm the goods contained in the shopping cart from the information obtained by the plurality of sensors and NFC readers.

In operation S310, the store terminal 2000 provides the goods list of the confirmed goods to the mobile terminal 1000. As the mobile terminal 1000 approaches the store terminal 2000, the store terminal 2000 may provide the goods list of the confirmed goods to the mobile terminal 1000, but the present embodiment is not limited thereto. The store terminal 2000 may provide the goods list of the confirmed goods to the mobile terminal 1000 via other communication means. Also, the store terminal 2000 may update the goods list of the goods contained in the shopping cart in real time and may provide the goods list to the mobile terminal 1000.

In operation S312, the store terminal 2000 provides the goods list of the confirmed goods to the server 3000. The store terminal 2000 may update the goods list of the goods contained in the shopping cart in real time and may provide the goods list to the server 3000. Although the store terminal 2000 provides the goods list to the server 3000 in operation S312, the present embodiment is not limited thereto. The mobile terminal 1000 that receives the goods list from the store terminal 2000 may provide the received goods list to the server 3000. In this case, the right of the mobile terminal 1000 to edit the goods list provided from the store terminal 2000 to the mobile terminal 1000 may be limited. Also, in this case, the store terminal 2000 may previously provide the connection information for connecting to the server 3000 to the mobile terminal 1000.

In operation S314, the server 3000 provides store information, goods information, and event information about the goods to the mobile terminal 1000. The server 3000 may provide the store map information to the mobile terminal 1000.

Also, the server 3000 may provide to the mobile terminal 1000 goods information about the goods included in the wish list and the goods confirmed by the store terminal 2000. The goods information provided by the server 3000 may include, for example, information about names, brands, and prices of the goods, and location information of the goods. Also, the location information of the goods, which is information about where the goods are located in the store, may include, for example, coordinate values on a store map, but the present embodiment is not limited thereto. Also, the server 3000 may provide to the mobile terminal 1000 goods information about goods other than the goods confirmed by the server 3000 from among the goods included in the wish list.

Also, the server 3000 may provide to the mobile terminal 1000 event information about the goods included in the wish list and the goods confirmed by the server 3000. The event information about the goods may include, for example, discount information and coupon information, but the present embodiment is not limited thereto. Also, the server 3000 may provide to the mobile terminal 1000 event information about goods other than the goods confirmed by the server 3000 from among the goods included in the wish list.

In operation S316, the mobile terminal 1000 displays a goods list of the goods that the user may purchase. The mobile terminal 1000 may distinctively display the goods included in the wish list from the goods included in the goods list received from the store terminal 2000. The mobile terminal 1000 may first display information about the goods included in the wish list, and may delete information about the goods contained in the shopping cart from the displayed information, but the present embodiment is not limited thereto.

Also, the mobile terminal 1000 may display the store map on the screen based on the store map information received from the server 3000, and may display the goods information and the event information about the goods at predetermined locations on the displayed store map.

In operation S318, the mobile terminal 1000 requests the server 3000 process payment of the goods. The mobile terminal 1000 may request the server 3000 process payment of the goods by transmitting a goods list of the goods to be paid for to the server 3000 and providing payment information to the server 3000. The payment information may include, for example, card information and authentication information of the user of the mobile terminal 1000. Also, the goods list of the goods to be paid for may be the goods list received from the store terminal 2000.

In operation S320, the server 3000 processes the payment of the goods. The server 3000 may compare the goods list of the goods to be paid for received from the mobile terminal 1000 with the goods list received from the store terminal 2000. Also, when the goods list of the goods to be paid for received from the mobile terminal 1000 and the goods list received from the store terminal 2000 are the same, the payment requested from the mobile terminal 1000 may be permitted. Also, when the payment is permitted, the server 3000 may processes the payment of the goods included in the goods list received from the mobile terminal 1000 by using the card information and the authentication information received from the mobile terminal 1000.

In operation S322, the server 3000 provides payment completion information to the store terminal 2000. The server 3000 may provide to the store terminal 2000 the goods list of the goods that are paid for and notice information indicating that the goods are paid for. According to another exemplary embodiment, the server 3000 or the store terminal 2000 may provide the payment completion information to the mobile terminal 1000 which may, in turn, display the payment completion information to the user.

In operation S324, the store terminal 2000 changes the right to pass the gate. The store terminal 2000 may compare the goods list of the goods that are paid for by the server 3000 with the goods list of the goods confirmed by the store terminal 2000, and may change the right to pass the gate when the goods list of the goods that are paid for and the goods list of the goods confirmed by the store terminal 2000 are the same. When the right to pass the gate of the store terminal 2000 is changed to 'permission', the store terminal 2000 may pass the gate of the store.

When goods are newly contained in the shopping cart of the user after the payment completion information is received, the goods list of the goods that are paid for by the server 3000 and the goods list of the goods confirmed by the store terminal 2000 may be different from each other. In this case, the store terminal 2000 may re-change the right to pass the gate to 'rejection'.

Figure 4:
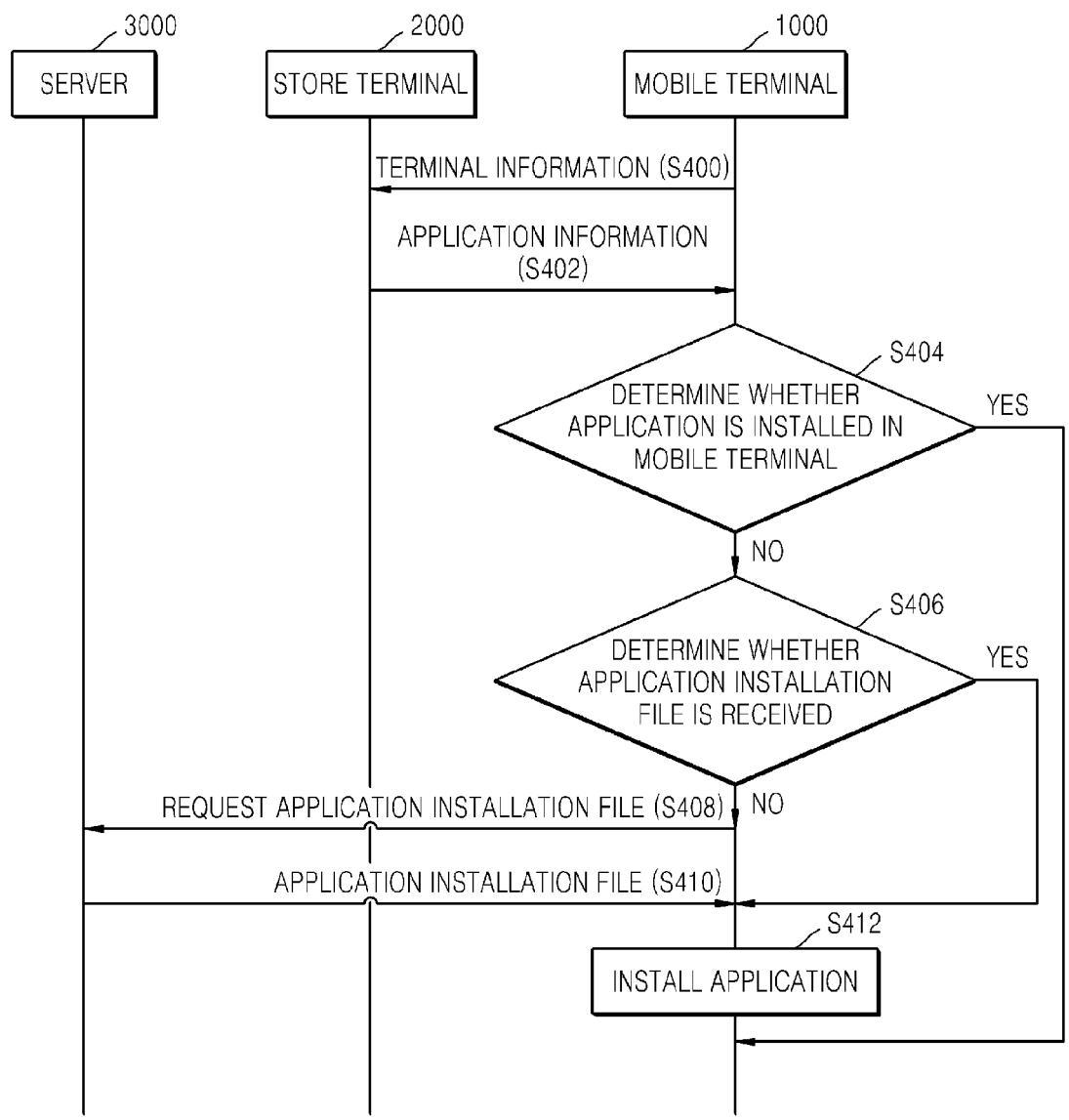
FIG. 4 is a flowchart illustrating a method where a mobile terminal installs an application based on application information received from a store terminal, according to an exemplary embodiment.

FIG. 4 is a flowchart illustrating a method where the mobile terminal 1000 installs the application based on the application information received from the store terminal 2000, according to an exemplary embodiment.

In operation S400, the mobile terminal 1000 provides the terminal information to the store terminal 2000. As the mobile terminal 1000 and the store terminal 2000 approach each other, the mobile terminal 1000 may provide the terminal information about the mobile terminal 1000 to the store terminal 2000. The mobile terminal 1000 may provide the terminal information to the store terminal 2000 via NFC. The terminal information may include, for example, a type of the mobile terminal 1000, a model name of the mobile terminal 1000, a specification of the mobile terminal 1000, a type of OS installed in the mobile terminal 1000, and connection information for communicating with the mobile terminal 1000.

In operation S402, the store terminal 2000 provides the application information to the mobile terminal 1000. As the mobile terminal 1000 and the store terminal 2000 approach each other, the store terminal 2000 may provide the application information about the application for using the service provided by the store to the mobile terminal 1000.

The application information may include at least one of link information for downloading an application installation file, and the application installation file. When the store terminal 2000 provides the application information to the mobile terminal 1000 via NFC, the store terminal 2000 may provide the link information for downloading the application installation file to the mobile terminal 1000. Also, when the store terminal 2000 provides the application information via communication means other than NFC to the mobile terminal 1000, the store terminal 2000 may provide the application installation file to the mobile terminal 1000. In this case, examples of the other communication means may include WiFi communication, 3G communication, 4G communication, and Bluetooth communication.

Also, the store terminal 2000 may provide the application information about the application suitable for the mobile terminal 1000 to the mobile terminal 1000. The store terminal 2000 may provide the application information about the application suitable for the OS installed in the mobile terminal 1000 to the mobile terminal 1000 based on the terminal information. Also, the store terminal 2000 may provide the application information about the application suitable for a specification of the mobile terminal 1000 based on the terminal information.

In operation S404, the mobile terminal 1000 determines whether the application corresponding to the application information is installed in the mobile terminal 1000.

When it is determined in operation S404 that the application corresponding to the application information is not installed in the mobile terminal 1000, the method proceeds to operation S406. In operation S406, the mobile terminal 1000 determines whether the application installation file is received from the store terminal 2000. The mobile terminal 1000 may determine whether the application installation file is included in the application information received from the store terminal 2000.

When it is determined in operation S406 that the mobile terminal 1000 has not received the application installation file, the method proceeds to operation S408. In operation S408, the mobile terminal 1000 requests the server 3000 for the application installation file. The mobile terminal 1000 may extract a link address for downloading the application installation file from the application information received from the store terminal 2000, and may request the server 3000 for the application installation file by using the extracted link address. In this case, the mobile terminal 1000 may also provide the terminal information of the mobile terminal 1000 to the server 3000.

When it is determined in operation S406 that the mobile terminal 1000 has received the application installation file, the method proceeds to operation S412.

In operation S410, the server 3000 provides the application installation file to the mobile terminal 1000. The server 3000 may provide the application installation file suitable for the mobile terminal 1000 to the mobile terminal 1000 based on the terminal information of the mobile terminal 1000.

In operation S412, the mobile terminal 1000 installs the application. The mobile terminal 1000 may install the application for performing the service provided by the store in the mobile terminal 1000 by executing the application installation file.

Figure 5:
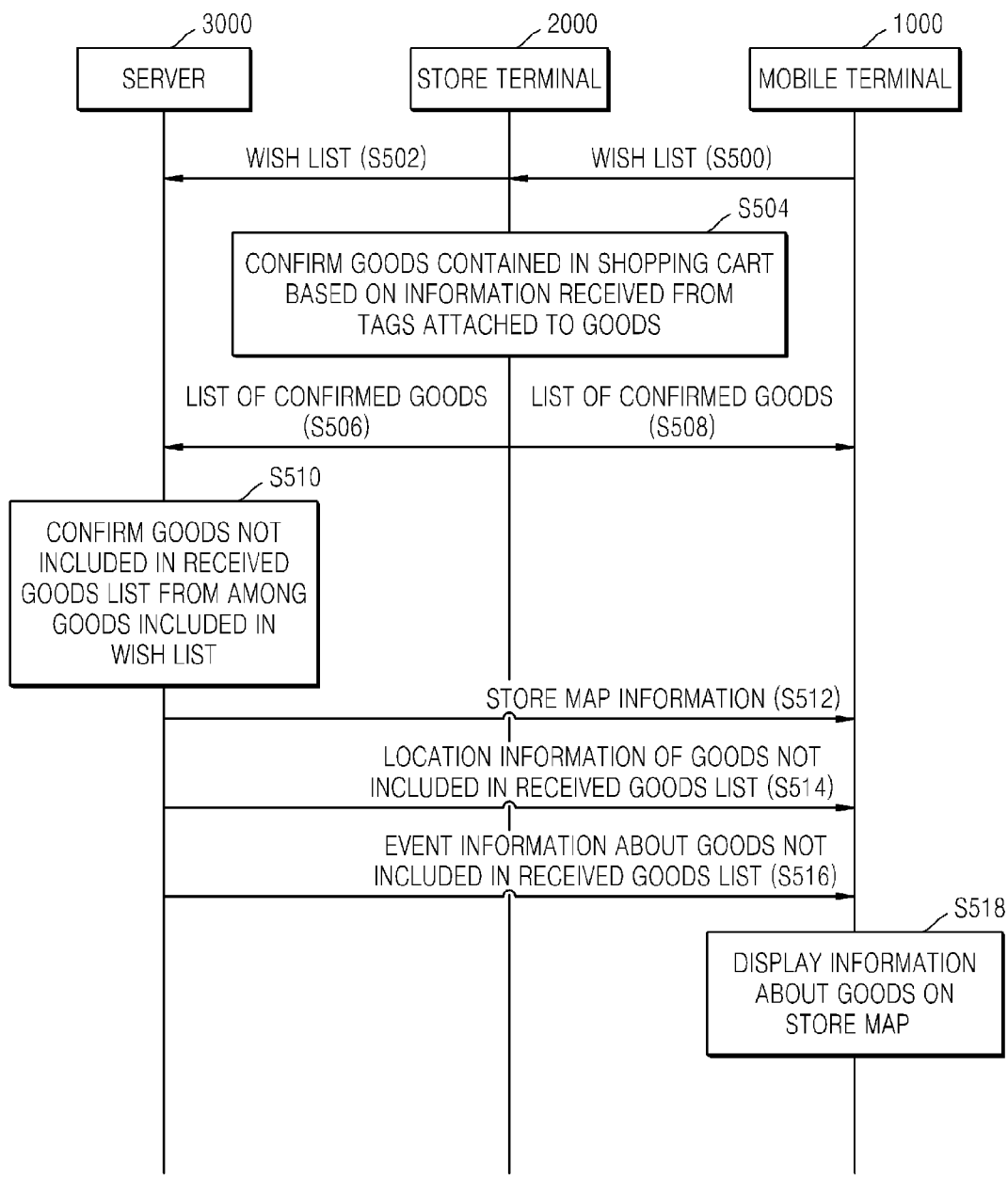
FIG. 5 is a flowchart illustrating a method where a mobile terminal displays information about the goods, according to an exemplary embodiment.

FIG. 5 is a flowchart illustrating a method where a mobile terminal 1000 displays the information about the goods, according to an exemplary embodiment.

In operation S500, the mobile terminal 1000 provides the wish list of the user for the goods to the store terminal 2000. As the mobile terminal 1000 and the store terminal 2000 approach each other, the mobile terminal 1000 may provide the wish list for the goods that the user may purchase to the store terminal 2000 via NFC.

However, the present embodiment is not limited thereto, and the mobile terminal 1000 may provide the wish list to the store terminal 2000 via other communication means. In this case, the mobile terminal 1000 and the store terminal 2000 may transmit/receive connection information for using the other communication means via NFC, and the mobile terminal 1000 may provide the wish list to the store terminal 2000 via the other communication means by using the transmitted/received connection information. Examples of the other communication means may include WiFi communication, 3G communication, 4G communication, and Bluetooth communication.

In operation S502, the store terminal 2000 provides the wish list of the user to the server 3000. The store terminal 2000 may provide the wish list to the server 3000 via at least one of, for example, WiFi communication, 3G communication, and 4G communication. Also, the store terminal 2000 may also provide the terminal information of the mobile terminal 1000 to the server 3000 along with the wish list of the user.

Although the store terminal 2000 provides the wish list of the user to the server 3000 in operation S502, the present embodiment is not limited thereto. The store terminal 2000 may provide connection information for connecting to the server 3000 to the mobile terminal 1000, and the mobile terminal 1000 may provide the wish list to the server 3000 by using the connection information.

In operation S504, the store terminal 2000 confirms the goods contained in the shopping cart based on the information received from the tags attached to the goods. For example, as the user brings the goods that are to be purchased from the store toward the store terminal 2000, the store terminal 2000 may receive the information about the goods from the tags attached to the goods via NFC.

Also, the store terminal 2000 may confirm the goods contained in the shopping cart by using the plurality of sensors and NFC readers located on the shopping cart. In this case, the plurality of sensors and NFC readers may be located on the shopping cart, and may obtain the information about the goods contained in the shopping cart. Also, the store terminal 2000 may confirm the goods contained in the shopping cart from the information obtained by the plurality of sensors and NFC readers.

In operation S506, the store terminal 2000 provides the goods list of the confirmed goods to the server 3000, and in operation S508, the store terminal 2000 provides the goods list of the confirmed goods to the mobile terminal 1000. The store terminal 2000 may update the goods list of the goods contained in the shopping cart in real time and may provide the goods list to the server 3000 and the mobile terminal 1000. Also, the store terminal 2000 may provide the goods list of the confirmed goods to the server 3000 and the mobile terminal 1000 via at least one of NFC, WiFi communication, 3G communication, and 4G communication.

In operation S510, the server 3000 confirms the goods not included in the goods list confirmed by the store terminal 2000 from the goods included in the wish list. The server 3000 may confirm the goods not included in the goods list confirmed by the store terminal 2000 from among the goods included in the wish list by comparing the goods included in the wish list with the goods included in the goods list confirmed by the store terminal 2000.

In operation S512, the server 3000 provides store map information to the mobile terminal 1000.

In operation S514, the server 3000 provides to the mobile terminal 1000 location information of the goods not included in the goods list of the goods confirmed by the store terminal 2000. The location information of the goods, which is information about where the goods are located in the store, may include, for example, coordinate values on the store map, but the present embodiment is not limited thereto.

The server 3000 may provide detailed information of the goods to the mobile terminal 1000 along with the location information of the goods not included in the goods list of the goods confirmed by the store terminal. For example, the detailed information of the goods may include information about names, brands, and prices of the goods, and the location information of the goods.

In operation S516, the server 3000 provides to the mobile terminal 1000 event information about the goods not included in the goods list of the goods confirmed by the store terminal 2000. The event information about the goods may include, for example, discount information and coupon information, but the present embodiment is not limited thereto.

In operation S518, the mobile terminal 1000 displays the information about the goods on the store map. The mobile terminal 1000 may display the store map on the screen of the mobile terminal 1000 based on the received store map information, and may display the information about the goods on the displayed store map. The mobile terminal 1000 may distinctively display the information about the goods included in the wish list and the goods contained in the shopping cart. Also, the mobile terminal 1000 may display information about names, prices, and events of the goods at predetermined locations on the store map, and may delete the goods contained in the shopping cart from the store map when the user puts the goods in the shopping cart.

Figure 6:
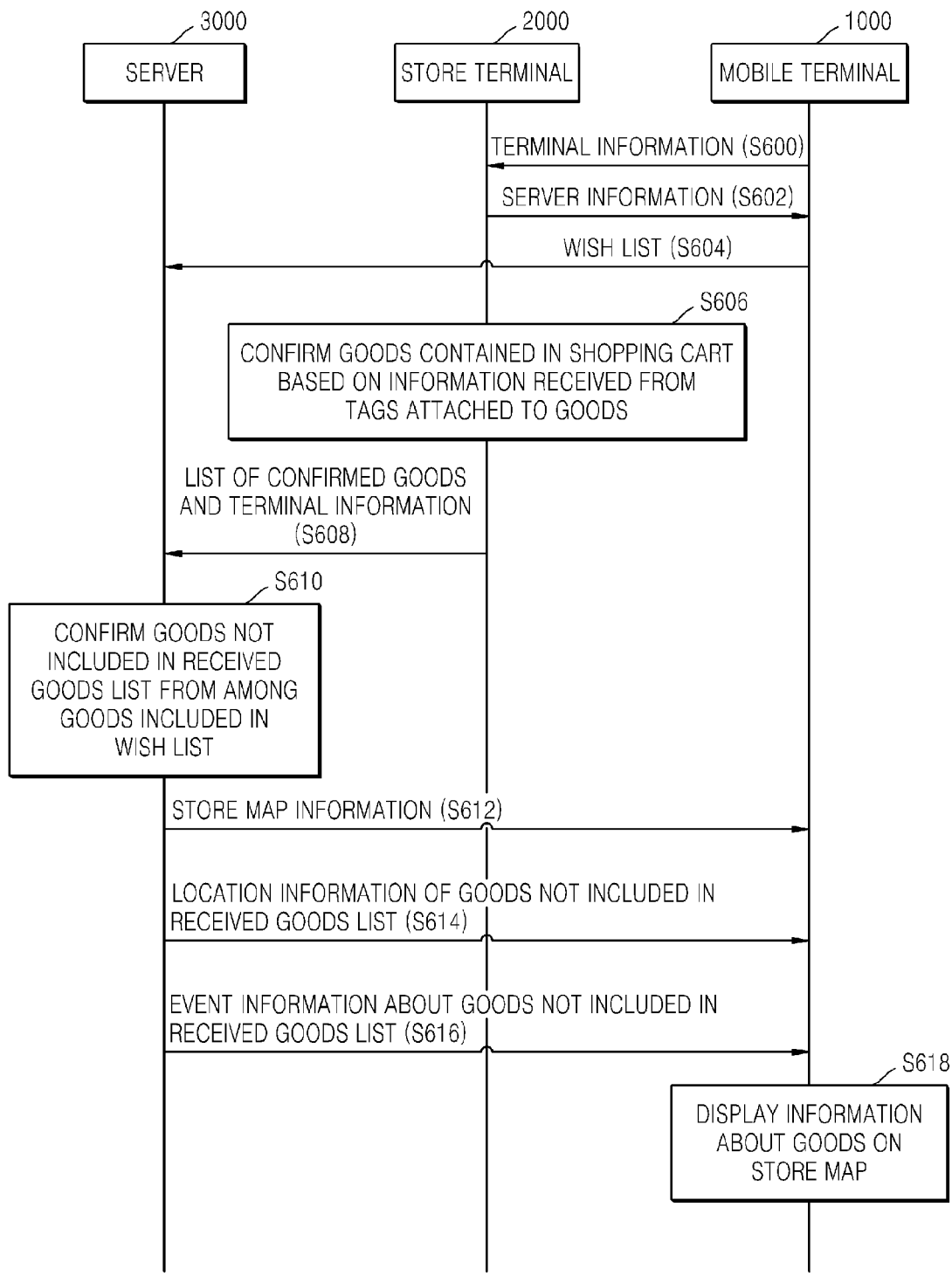
FIG. 6 is a flowchart illustrating a method where a mobile terminal displays information about the goods, according to another exemplary embodiment.

FIG. 6 is a flowchart illustrating a method where a mobile terminal 1000 displays the information about the goods, according to another exemplary embodiment. In FIG. 6, the mobile terminal 1000 may directly provide the wish list of the user for the goods to the server 3000, and may receive the information about the goods from the server 3000.

In operation S600, the mobile terminal 1000 provides the terminal information to the store terminal 2000. The mobile terminal 1000 provides the terminal information to the store terminal 2000. As the mobile terminal 1000 and the store terminal 2000 approach each other, the mobile terminal 1000 may provide the terminal information about the mobile terminal 1000 to the store terminal 2000. The mobile terminal 1000 may provide the terminal information to the store terminal 2000 via NFC. The terminal information may include, for example, a type, a model name, and a specification of the mobile terminal 1000, a type of OS installed in the mobile terminal 1000, and connection information for communicating with the mobile terminal 1000.

In operation S602, the store terminal 2000 provides server information to the mobile terminal 1000. The store terminal 2000 may provide to the mobile terminal 1000 connection information for connecting to the server 3000 that provides the service provided by the store. The server information may include, for example, an Internet protocol (IP) address of the server 3000.

In operation S604, the mobile terminal 1000 provides the wish list of the user for the goods to the server 3000. The mobile terminal 1000 may generate and store the wish list for the goods that the user may purchase from the store based on the user's input. Also, the mobile terminal 1000 may provide the wish list generated by the server 3000 by using the received server information.

In operation S606, the store terminal 2000 confirms the goods contained in the shopping cart based on the information received from the tags attached to the goods. The store terminal 2000 may confirm the goods contained in the shopping cart by receiving the information about the goods from the tags attached to the goods. For example, as the user brings the goods that are to be purchased from the store toward the store terminal 2000, the store terminal 2000 may receive the information about the goods from the tags attached to the goods via NFC.

Also, the store terminal 2000 may confirm the goods contained in the shopping cart by using the plurality of sensors and NFC readers located on the shopping cart. In this case, the plurality of sensors and NFC readers may be uniformly located on the shopping cart, and may obtain the information about the goods contained in the shopping cart. Also, the store terminal 2000 may confirm the goods contained in the shopping cart from the information obtained by the plurality of sensors and NFC readers.

In operation S608, the store terminal 2000 provides the terminal information and the goods list of the goods confirmed by the store terminal 2000 to the server 3000. The store terminal 2000 may update the goods list of the goods contained in the shopping cart in real time and may provide the goods list to the server 300.

In operation S610, the server 3000 confirms the goods not included in the goods list of the goods confirmed by the store terminal 2000 from among the goods included in the wish list. The server 3000 may confirm the goods not included in the goods list confirmed by the store terminal 2000 from among the goods included in the wish list by comparing the goods included in the wish list with the goods included in the goods list confirmed by the store terminal 2000.

In operation S612, the server 3000 provides store map information to the mobile terminal 1000.

In operation S614, the server 3000 provides to the mobile terminal 1000 location information of the goods not included in the goods list of the goods confirmed by the store terminal 2000. The location information of the goods, which is information about where the goods are located in the store, may include, for example, coordinate values on the store map, but the present embodiment is not limited thereto.

The server 3000 may provide detailed information of the goods to the mobile terminal 1000 along with the location information of the goods not included in the goods list of the goods confirmed by the store terminal 2000. The detailed information of the goods may include, for example, information about names, brands, and prices of the goods, and the location information of the goods.

In operation S616, the server 300 provides to the mobile terminal 1000 event information about the goods not included in the goods list of the goods confirmed by the store terminal 2000. The event information of the goods may include, for example, discount information and coupon information, but the present embodiment is not limited thereto.

In operation S618, the mobile terminal 1000 displays the information about the goods on the store map. The mobile terminal 1000 may display the store map on the screen of the mobile terminal 1000 based on the received store map information, and may display the information about the goods on the displayed store map. The mobile terminal 1000 may display information about names and prices of the goods and the event information about the goods at predetermined locations on the store map, and may delete the goods contained in the shopping cart when the user puts the goods in the shopping cart from the store map.

Figure 7:
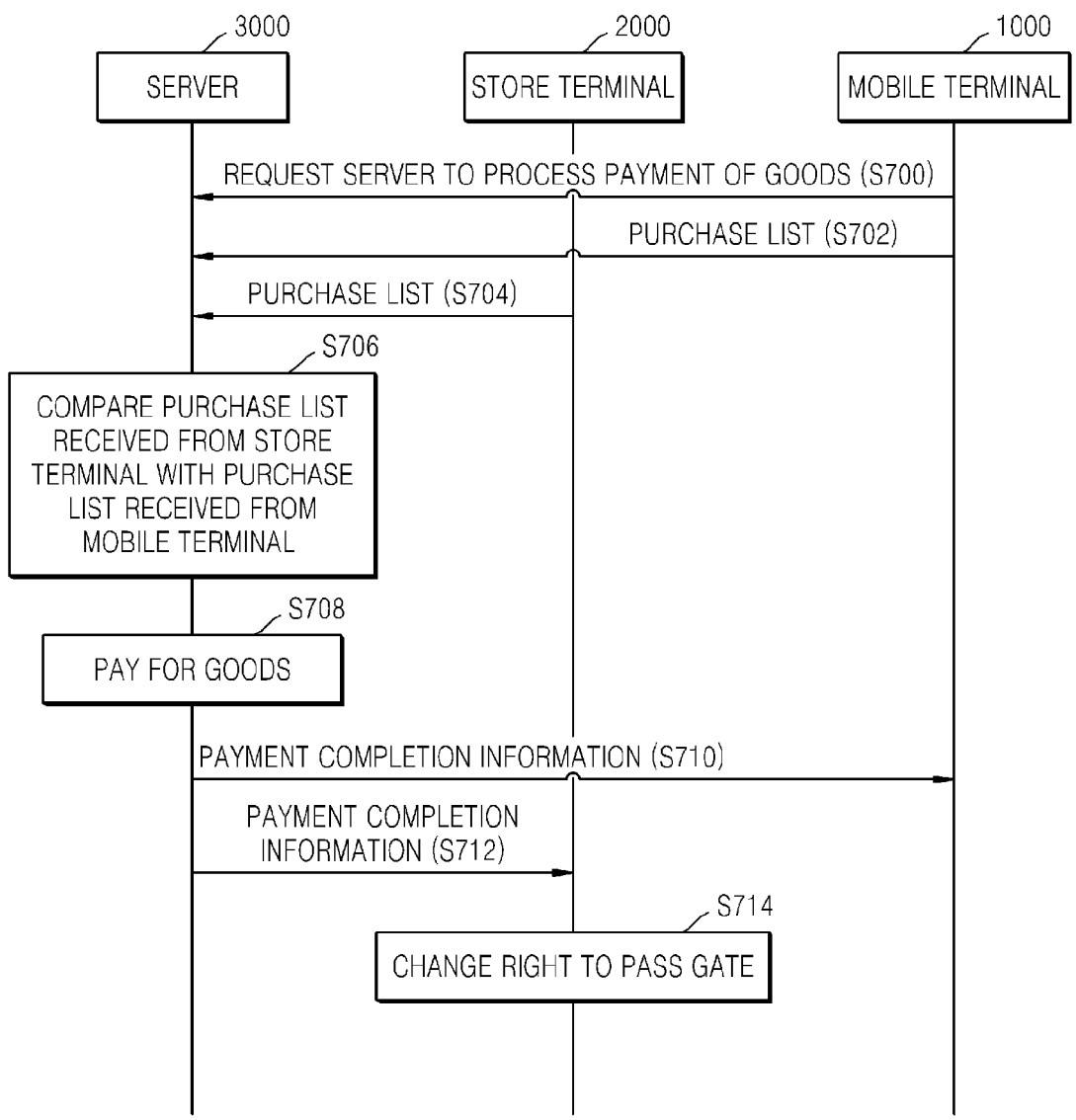
FIG. 7 is a flowchart illustrating a method of paying for the goods, according to an exemplary embodiment.

FIG. 7 is a flowchart illustrating a method of paying for the goods, according to an exemplary embodiment.

In operation S700, the mobile terminal 1000 requests the server 3000 process payment of the goods. The mobile terminal 1000 may provide payment information needed to process payment of the goods to the server 3000, and may request the server 3000 process payment of the goods. The payment information may include, for example, credit card information, coupon information, and authentication information.

In operation S702, the mobile terminal 1000 transmits a purchase list to the server 3000. The mobile terminal 1000 may transmit a goods list of the goods that the user may purchase to the server 3000. The purchase list provided to the server 3000 may be the goods list of the goods contained in the shopping cart received from the store terminal 2000, but the present embodiment is not limited thereto. The mobile terminal 1000 may provide the purchase list to the server 3000 by inputting the goods list of the goods that the user may purchase to the mobile terminal 1000.

Also, although operations S700 and S702 are separately performed, the present embodiment is not limited thereto. The mobile terminal 1000 may provide the purchase list to the server 3000 while requesting the server 3000 process payment of the goods.

In operation S704, the store terminal 2000 transmits a purchase list to the server 3000. The store terminal 2000 may confirm the goods contained in the shopping cart, and may transmit the goods list of the confirmed goods to the server 3000.

In operation S706, the server 3000 compares the purchase list received from the store terminal 2000 with the purchase list received from the mobile terminal 1000.

When it is determined in operation S706 that the purchase list received from the store terminal 2000 and the purchase list received from the mobile terminal 1000 are the same, the method proceeds to operation S708. In operation S708, the server 300 facilitated the payment of the goods. While the server 3000 processes the payment for the goods, the server 3000 may transmit/receive various pieces of information for payment to/from the mobile terminal 1000.

In operation S710, the server 3000 provides payment completion information to the mobile terminal 1000, and in operation S712, the server 3000 provides the payment completion information to the store terminal 2000. The payment completion information, which is information indicating that the goods are paid for by the server 3000, may include information about the goods that are paid for and a payment amount.

In operation S714, the store terminal 2000 changes the right to pass the gate. The store terminal 2000 may compare a goods list of the goods that are paid for by the server 3000 with the goods list of the goods confirmed by the store terminal 2000, and may change the right to pass the gate when the goods list of the goods that are paid for by the server 3000 and the goods list of the goods confirmed by the store terminal 2000 are the same. When the right to pass the gate of the store terminal 2000 is changed to 'permission', the store terminal 2000 may pass the gate of the store.

When goods are newly contained in the shopping cart of the user after the payment completion information is received, the goods list of the goods that are paid for by the server 300 and the goods list of the goods confirmed by the store terminal 2000 are different from each other. In this case, the store terminal 2000 may re-change the right to pass the gate to 'rejection'.

Figure 8:
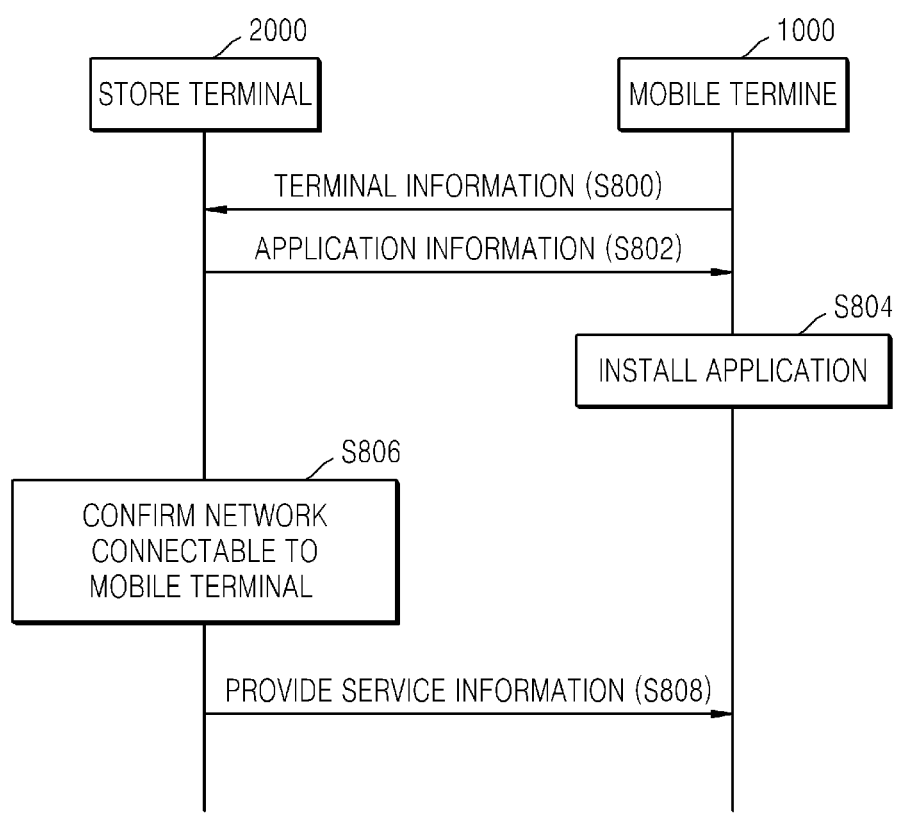
FIG. 8 is a flowchart illustrating a method where a mobile terminal receives waiting list information from a store terminal, according to an exemplary embodiment.

FIG. 8 is a flowchart illustrating a method where a mobile terminal 1000 receives waiting list information from a store terminal 2000, according to an exemplary embodiment. In FIG. 8, the store terminal 2000 may be a terminal that is located in a place like a bank, and may provide waiting list information for using a service of the bank.

In operation S800, the mobile terminal 1000 provides the terminal information to the store terminal 2000. As the mobile terminal 1000 and the store terminal 2000 approach each other, the mobile terminal 1000 may provide the terminal information to the store terminal 2000. The terminal information may include, for example, a type, a model name, and a specification of the mobile terminal 1000, a type of OS installed in the mobile terminal 1000, and connection information for communicating with the mobile terminal 1000.

In operation S802, the store terminal 2000 provides application information to the mobile terminal 1000. As the mobile terminal 1000 and the store terminal 2000 approach each other, the store terminal 2000 may provide the application information to the mobile terminal 1000. The application information, which is information about the application for using the service provided by the store, may include link information for downloading an application installation file, and the application installation file. Also, the store terminal 2000 may provide the application information suitable for the mobile terminal 1000 to the mobile terminal 1000 based on the terminal information.

Also, the mobile terminal 1000 and the store terminal 2000 may transmit/receive information with respect to each other via other communication means as well as NFC. In this case, the mobile terminal 1000 and the store terminal 2000 may transmit/receive connection information for using the other communication means via NFC, and may transmit/receive the terminal information and the application information via the other communication means by using the transmitted/received connection information. For example, the mobile terminal 1000 and the store terminal 2000 may transmit/receive information via WiFi communication, but the present embodiment is not limited thereto. Examples of the other communication means may include WiFi communication, 3G communication, 4G communication, and Bluetooth communication.

In operation S804, the mobile terminal 1000 installs the application. The mobile terminal 1000 may install the application for using the service provided by the store based on the application information received from the store terminal 2000. When the mobile terminal 1000 receives the application installation file from the store terminal 2000, the mobile terminal 1000 may install the application by using the application installation file. Also, when the mobile terminal 1000 receives the link information for downloading the application installation file, the mobile terminal 1000 may download the application installation file by using the link information and may install the application.

In operation S806, the store terminal 2000 confirms a network that may be connected to the mobile terminal 1000. When the mobile terminal 1000 and the store terminal 2000 transmit/receive the connection information for using the other communication means via NFC, the store terminal 2000 may confirm the network that may be connected to the mobile terminal 1000 based on the received connection information. The mobile terminal 1000 may confirm at least one of, for example, WiFi communication, 3G communication, 4G communication, and Bluetooth communication.

In operation S808, the store terminal 2000 provides service information to the mobile terminal 1000. For example, when the store terminal 2000 is located in a bank, the service information may include information about a waiting list number assigned to the user for a bank service, a waiting list number of the user who is currently using a bank service, and a waiting time.

Figure 9:
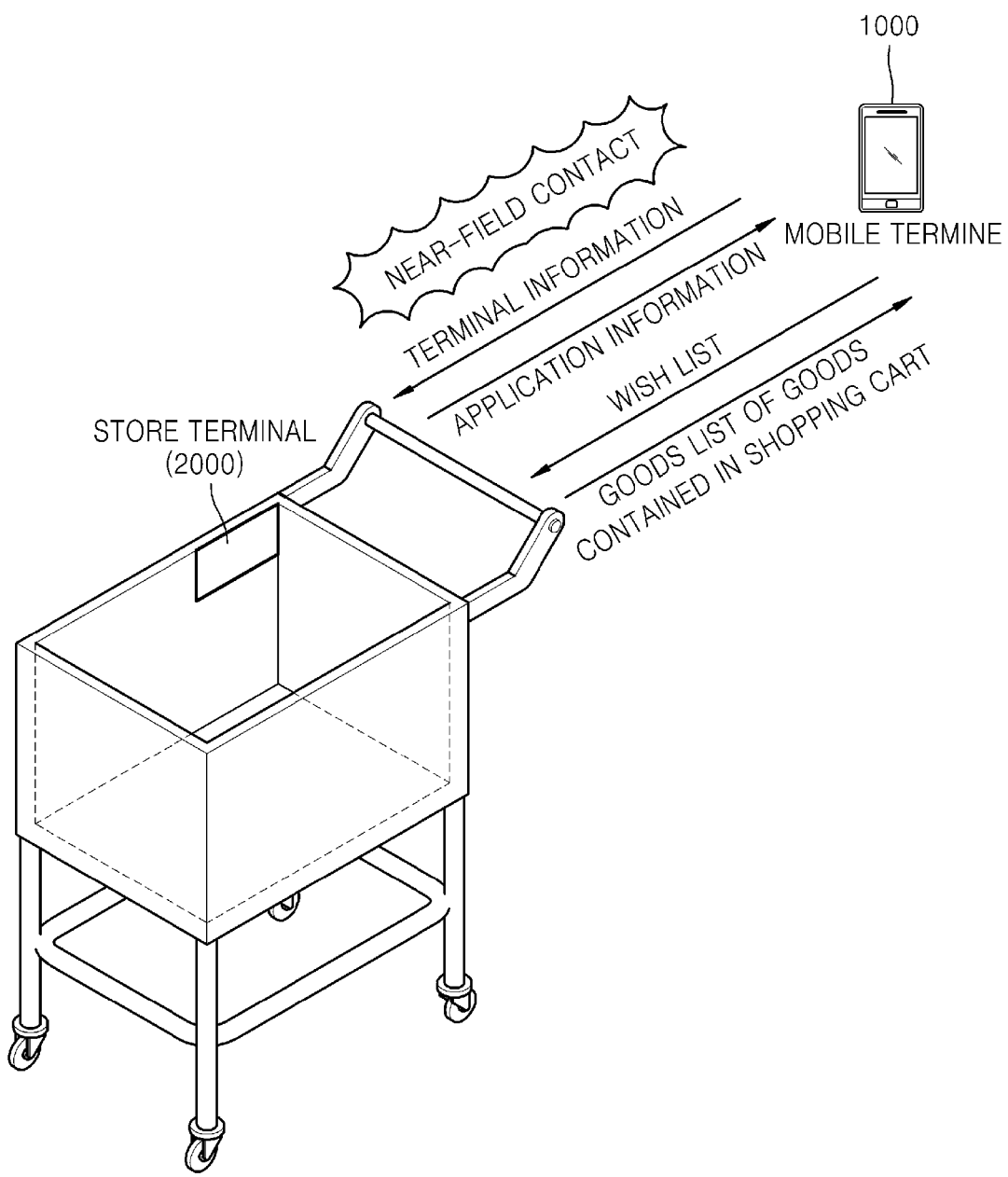
FIG. 9 is a view for explaining a process where a mobile terminal transmits/receives information to/from a store terminal, according to an exemplary embodiment.

FIG. 9 is a view for explaining a process where a mobile terminal 1000 transmits/receives information to/from a store terminal 2000, according to an exemplary embodiment.

Referring to FIG. 9, when the mobile terminal 1000 performs near-field contact with the store terminal 2000, the mobile terminal 1000 may provide the terminal information to the store terminal 2000, and the store terminal 2000 may provide the application information to the mobile terminal 1000. Also, the mobile terminal 1000 may install the application for using the service of the store based on the application information, and may provide the wish list of the user to the store terminal 2000. Also, the store terminal 2000 may confirm the goods contained in the shopping cart, and may provide the goods list of the confirmed goods to the mobile terminal 1000.

Meanwhile, the store terminal 2000 may provide the application information and the goods list of the goods contained in the shopping cart to the mobile terminal 1000 via NFC and other communication means, and the mobile terminal 1000 may provide the wish list to the store terminal 2000 via NFC and other communication means. In this case, the store terminal 2000 and the mobile terminal 1000 may transmit/receive connection information for using the other communication means. For example, the other communication means may be WiFi communication, and the store terminal 2000 and the mobile terminal 1000 may transmit/receive IP addresses thereof via NFC, and may be connected to each other via WiFi communication by using the transmitted/received IP addresses.

Figure 10:
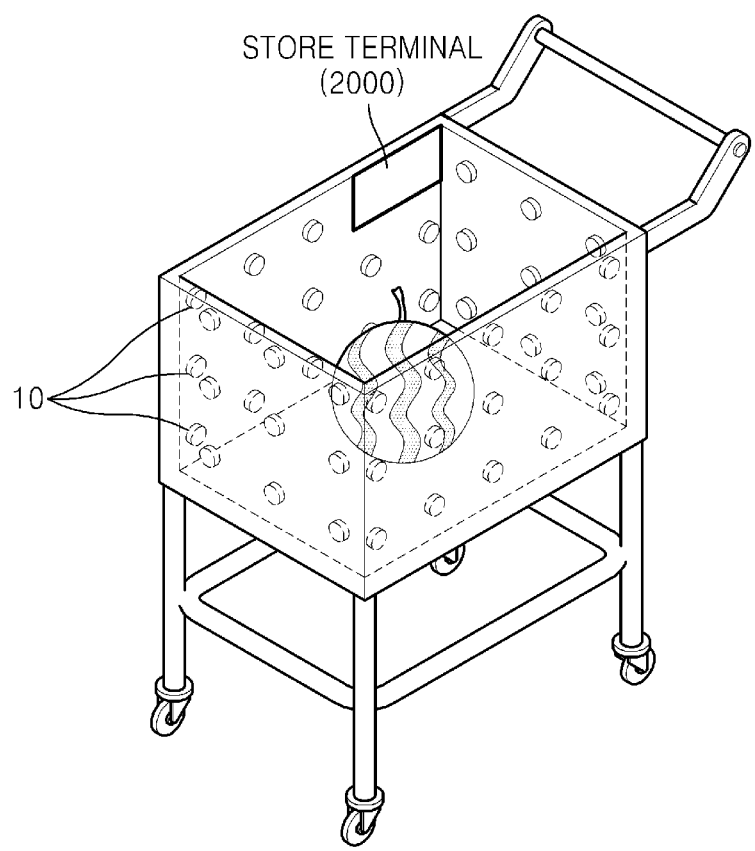
FIG. 10 is a view for explaining a process where a store terminal confirms goods contained in a shopping cart, according to an exemplary embodiment.

FIG. 10 is a view for explaining a process where a store terminal 2000 confirms the goods contained in the shopping cart.

Referring to FIG. 10, a plurality of NFC readers 10 may be attached to the shopping cart, and may identify the goods contained in the shopping cart. Also, the store terminal 2000 may receive identification values of the goods obtained by the plurality of NFC readers 10 from the plurality of NFC readers 10, and may confirm the goods contained in the shopping cart based on the received identification values. However, the present embodiment is not limited thereto, and the store terminal 2000 may include the NFC readers, and may identify the goods near to the store terminal 2000 by using the NFC readers. According to an exemplary embodiment the shopping cart may be a smaller basket that is carried by a user. Further, according to another exemplary embodiment the NFC readers 10, or other types of sensors, may be placed only along the upper perimeter edge of the cart or basket providing a sensor field. Further, when this sensor field, which covered the upper opening of the cart or basket, is penetrated by a good to be purchased, the good is detected at that point of entry into the cart/basket as it moves through the sensor field. The store terminal is then updated accordingly.

FIGS. 11A-11C illustrates views for explaining a process where a mobile terminal 1000 displays locations of the goods that the user may purchase on the store map, according to an exemplary embodiment.

Referring to FIG. 11A, when the wish list of the user includes 'spaghetti', soda', and 'sugar', the mobile terminal 1000 may display a location 20 of the user and locations of the 'spaghetti', the soda', and the 'sugar' on the store map displayed on the screen.

Also, referring to FIG. 11B, when the user moves to where the 'spaghetti' is located in the store and puts the 'spaghetti' in the shopping cart, the mobile terminal 1000 may delete the 'spaghetti' from the store map displayed on the screen.

Also, referring to FIG. 11C, when the user touches 'soda' displayed on the screen, the mobile terminal 1000 may display 'A soda' and 'B soda' which are items of a list of sodas, and may display prices of the 'A soda' and the 'B soda'. However, the present embodiment is not limited thereto, and the mobile terminal 1000 may also display event information about the soda.

Figure 12:
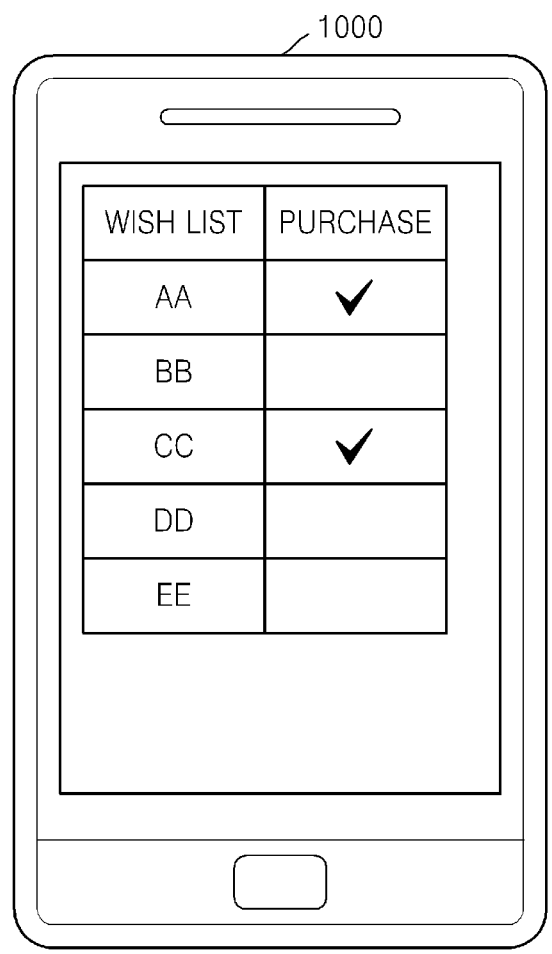
FIG. 12 is a view for explaining a process where a mobile terminal displays goods included in a wish list and a goods list of goods contained in a shopping cart, according to an exemplary embodiment.

FIG. 12 is a view for explaining a process performed by the mobile terminal 1000 to display the goods list of the goods included in the wish list and the goods contained in the shopping cart, according to an exemplary embodiment.

Referring to FIG. 12, the goods 'AA', 'BB', 'CC', 'DD', and 'EE' included in the wish list of the user may be displayed, and the goods contained in the shopping cart from among the goods in the wish list may be distinguishably displayed. Particularly, the items from the wish list that are in the cart may be indicated as such by checking a column corresponding to the item that is ready for purchasing as indicated by a check mark next to the corresponding item in an adjacent column.

Figure 13:
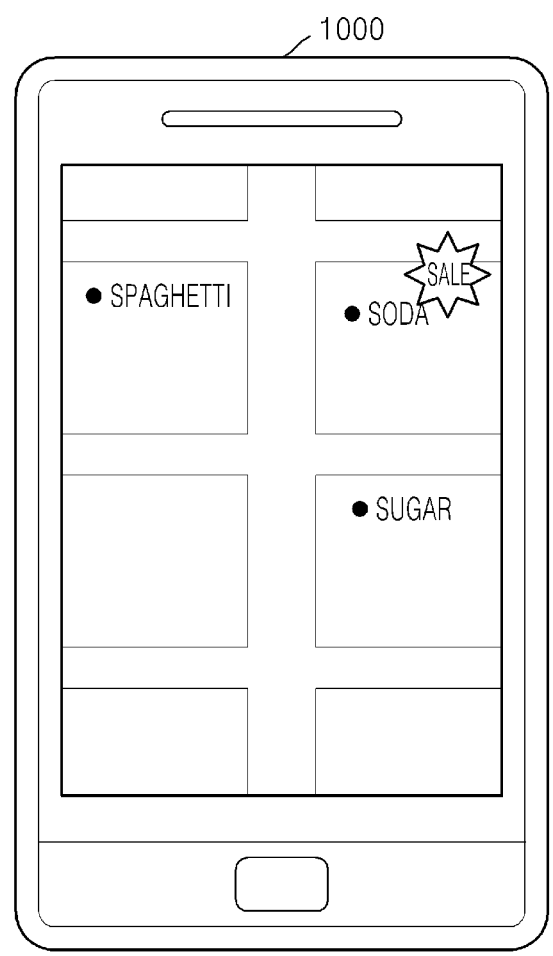
FIG. 13 is a view for explaining a process where a mobile terminal displays event information about goods, according to an exemplary embodiment.

FIG. 13 is a view for explaining a process where a mobile terminal 1000 displays event information about the goods, according to an exemplary embodiment.

Referring to FIG. 13, when 'spaghetti', 'soda', and 'sugar' are included in the wish list of the user, the mobile terminal 1000 may display locations of the 'spaghetti', the 'soda', and the 'sugar' on the store map displayed on the screen. Also, when events for some goods from among the goods displayed on the screen are currently taking place, information indicating the events may also be displayed. For example, when the 'soda' is available at a discounted price when the user is shopping, the mobile terminal 1000 may display 'sale' on the location of the soda on the store map.

Figure 14:
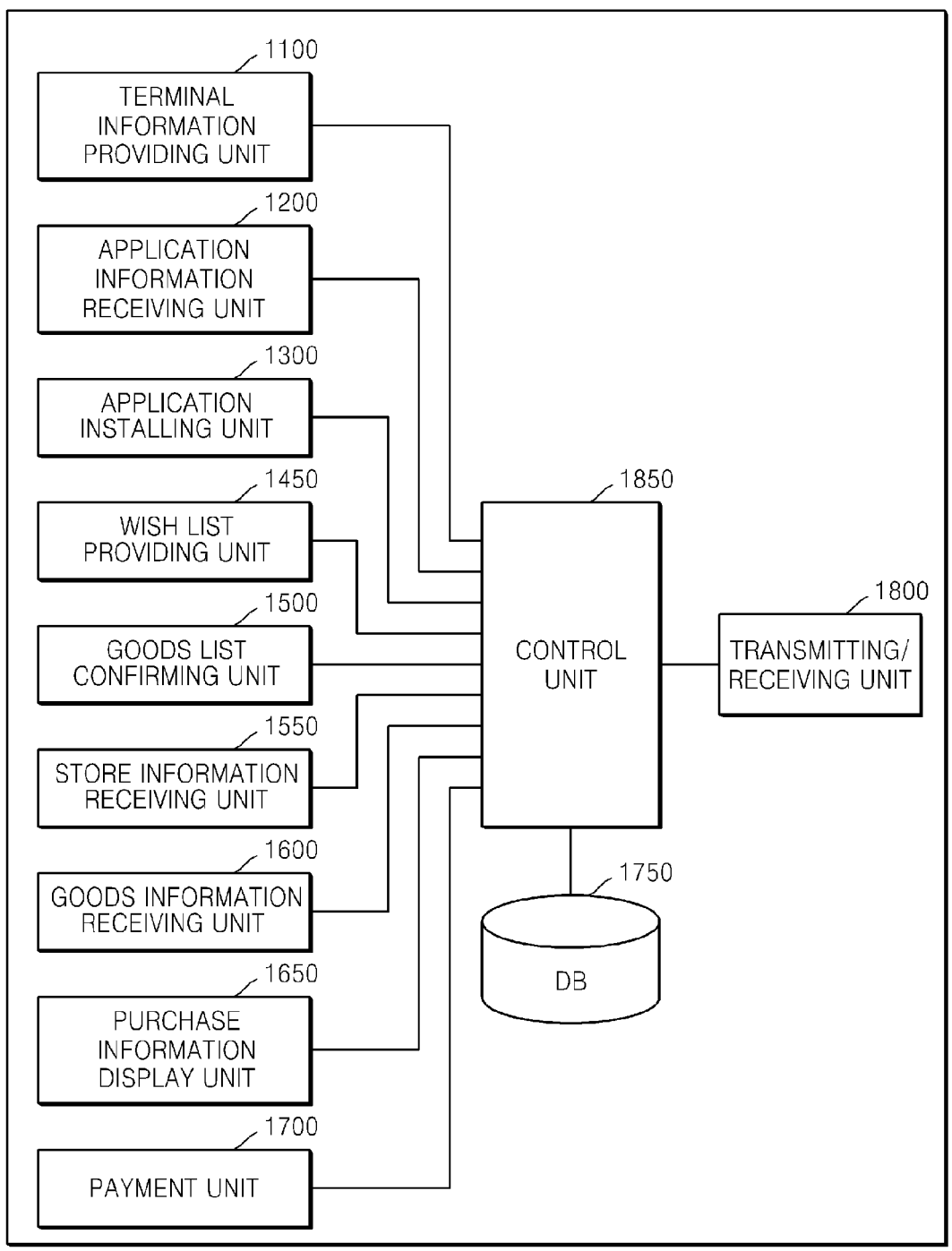
FIG. 14 is a block diagram illustrating a mobile terminal according to an exemplary embodiment.

FIG. 14 is a block diagram illustrating a mobile terminal 1000 according to an exemplary embodiment.

Referring to FIG. 14, the mobile terminal 1000 includes a terminal information providing unit 1100, an application information receiving unit 1200, an application installing unit 1300, a wish list providing unit 1450, a goods list confirming unit 1500, a store information receiving unit 1550, a goods information receiving unit 1600, a purchase information display unit 1650, a payment unit 1700, a database (DB) 1750, a transmitting/receiving unit 1800, and a control unit 1850.

The terminal information providing unit 1100 provides the terminal information to the store terminal 2000. As the mobile terminal 1000 and the store terminal 2000 approach each other, the terminal information providing unit 1100 may provide the terminal information about the mobile terminal 1000 to the store terminal 2000. The terminal information providing unit 1100 may provide the terminal information to the store terminal 2000 via NFC. The terminal information may include information about a type, a model name, and a specification of the mobile terminal 1000, a type of OS installed in the mobile terminal 1000, and connection information for communicating with the mobile terminal 1000.

The application information receiving unit 1200 receives the application information from the store terminal 2000. As the mobile terminal 1000 and the store terminal 2000 approach each other, the application information receiving unit 1200 may receive from the store terminal 2000 the application information about the application for using the service provided by the store to the mobile terminal 1000.

The application information may include link information for downloading an application installation file, and the application installation file. When the application information receiving unit 1200 receives the application information from the store terminal 2000 via NFC, the application information receiving unit 1200 may receive the link information for downloading the application installation file from the store terminal 2000. Also, when the application information receiving unit 1200 receives the application information via other communication means other than NFC, the application information receiving unit 1200 may receive the application installation file from the store terminal 2000. In this case, examples of the other communication means may include WiFi communication, 3G communication, 4G communication, and Bluetooth communication.

Also, the application information receiving unit 1200 may receive the application information about the application suitable for the mobile terminal 1000 from the store terminal 2000. The store terminal 2000 may provide the application information about the application suitable for the OS installed in the mobile terminal 1000 to the mobile terminal 1000 based on the terminal information. Also, the store terminal 2000 may provide the application information about the application suitable for a specification of the mobile terminal 1000 to the mobile terminal 1000 based on the terminal information.

The application installing unit 1300 determines whether the application corresponding to the application information is installed in the mobile terminal 1000. When it is determined that the application corresponding to the application information is not installed in the mobile terminal 1000, the application installing unit 1300 determines whether the application installation file is received from the store terminal 2000. The application installing unit 1300 may determine whether the application installation file is included in the application information received from the store terminal 2000.

Also, when it is determined that the mobile terminal 1000 has not received the application installation file, the application installing unit 1300 requests the server 3000 for the application installation file. The application installing unit 1300 may extract a link address for downloading the application installation file from the application information, and may request the server 3000 for the application installation file by using the extracted link address. In this case, the application installing unit 1300 may also provide the terminal information of the mobile terminal 1000 to the server 3000.

Also, when the mobile terminal 1000 receives the application installation file, the application installing unit 1300 may install the application. The application installing unit 1300 may install the application for performing the service provided by the store in the mobile terminal 1000 by executing the application installation file.

The wish list providing unit 1450 provides the wish list of the user for the goods to the store terminal 2000. The wish list providing unit 1450 may generate the wish list for the goods that the user is to purchase from the store based on the user's input. Also, as the mobile terminal 1000 approaches the store terminal 2000, the wish list providing unit 1450 may provide the generated wish list to the store terminal 2000 via NFC. However, the present embodiment is not limited thereto, and the wish list providing unit 1450 may provide the wish list to the store terminal 2000 via WiFi communication.

The wish list providing unit 1450 may provide the terminal information and the wish list to the store terminal 2000, and the store terminal 2000 may provide the terminal information and the wish list to the server 3000, but the present embodiment is not limited thereto. The wish list providing unit 1450 may receive connection information about the server 3000 from the store terminal 2000, and may directly provide the terminal information and the wish list to the server 3000.

The goods list confirming unit 1500 may receive the goods list of the goods contained in the shopping cart from the store terminal 2000, and may update the goods list of the wish list based on the received goods list. The goods list confirming unit 1500 may distinguish the goods included in the wish list from the goods included in the goods list received from the store terminal 2000.

The store information receiving unit 1550 receives store map information from the server 3000. The store map information may include store map data and information about where the goods are in the store, but the present embodiment is not limited thereto.

The goods information receiving unit 1600 receives information about the goods from the server 3000. The goods information receiving unit 1600 may receive information about the goods included in the wish list and the goods confirmed by the store terminal 2000 from the server 3000. Also, the goods information receiving unit 1600 may receive from the server 3000 information about goods not included in the goods list of the goods confirmed by the store terminal 2000 from among the goods included in the wish list. The information about the goods may include location information of the goods, and the location information of the goods may include, for example, coordinate values on the store map, but the present embodiment is not limited thereto. Also, the information about the goods may include detailed information of the goods. The detailed information of the goods may include information about names, brands, and prices of the goods, and the location information of the goods. Also, the information about the goods may include event information about the goods. The event information about the goods may include, for example, discount information and coupon information, but the present embodiment is not limited thereto.

The purchase information display unit 1650 displays the information about the goods on the store map. The purchase information display unit 1650 may display the store map on the screen of the mobile terminal 1000 based on the store map information, and may distinctively display the information about the goods included in the wish list and the goods contained in the shopping cart on the displayed store map. The purchase information display unit 1650 may display information about names of the goods, prices of the goods, and events about the goods at predetermined locations on the store map, and may delete the goods contained in the shopping cart from the store map when the user puts the goods in the shopping cart.

The payment unit 1700 requests the server 3000 process payment of the goods that the user is to purchase. The payment unit 1700 may provide payment information needed to process payment of the goods by the server 3000, and may request the server 3000 process payment of the goods. The payment information may include, for example, credit card information, coupon information, and authentication information. Also, the payment unit 1700 may transmit a goods list of the goods that the user is to purchase to the server 3000. The purchase list provided to the server 3000 may be the goods list of the goods contained in the shopping cart received from the store terminal 2000, but the present embodiment is not limited thereto. The payment unit 1700 may provide the purchase list to the server 3000 by inputting the goods list of the goods that the user is to purchase to the mobile terminal 1000.

The DB 1750 stores various pieces of information needed to install the application for using the service of the store based on the application information received from the store terminal 2000 and distinctively display the goods included in the wish list of the user and the goods contained in the shopping cart.

The transmitting/receiving unit 1800 transmits/receives to/from the store terminal 2000 and the server 3000 the various pieces of information needed to install the application for using the service of the store based on the application information received from the store terminal 2000 and distinctively displays the goods included in the wish list of the user and the goods contained in the shopping cart.

The control unit 1850 controls an overall operation of the mobile terminal 1000, and controls the terminal information providing unit 1100, the application information receiving unit 1200, the application installing unit 1300, the wish list providing unit 1450, the goods list confirming unit 1500, the store information receiving unit 1550, the goods information receiving unit 1600, the purchase information display unit 1650, the payment unit 1700, the DB 1750, and the transmitting/receiving unit 1800 so that the mobile terminal 1000 installs the application for using the service of the store based on the application information received from the store terminal 2000 and distinctively displays the goods included in the wish list of the user and the goods contained in the shopping cart.

Figure 15:
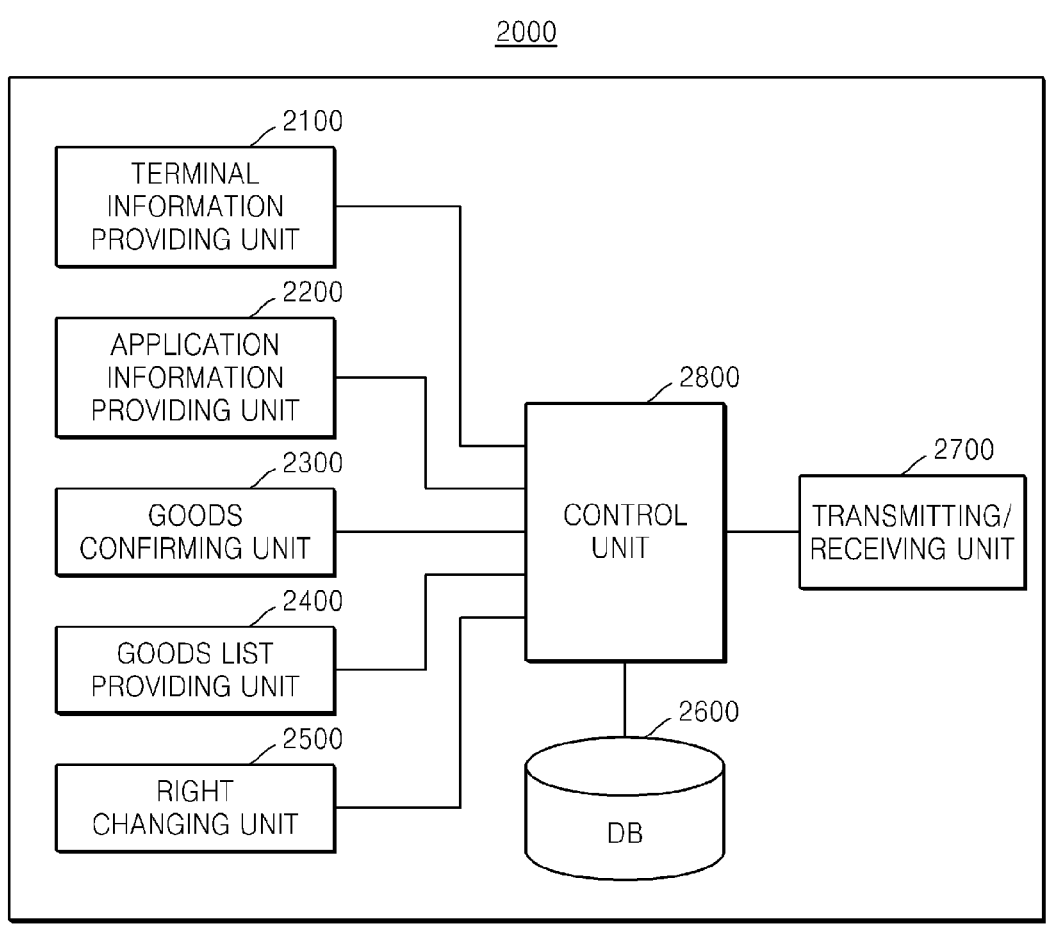
FIG. 15 is a block diagram illustrating a store terminal according to an exemplary embodiment.

FIG. 15 is a block diagram illustrating the store terminal 2000 according to an exemplary embodiment.

Referring to FIG. 15, a store terminal 2000 includes a terminal information receiving unit 2100, an application information receiving unit 2200, a goods confirming unit 2300, a goods list providing unit 2400, a right changing unit 2500, a DB 2600, a transmitting/receiving unit 2700, and a control unit 2800.

The terminal information receiving unit 2100 receives the terminal information from the mobile terminal 1000. As the mobile terminal 1000 and the store terminal 2000 approach each other, the terminal information may be received from the mobile terminal 1000 via NFC. The terminal information may include, for example, a type, a model name, and a specification of the mobile terminal 1000, a type of OS installed in the mobile terminal 1000, and connection information for communicating with the mobile terminal 1000.

The application information receiving unit 2200 provides the application information to the mobile terminal 1000. As the mobile terminal 1000 and the store terminal 2000 approach each other, the application information receiving unit 2200 may provide the application information about the application for using the service provided by the store to the mobile terminal 1000.

When the application information receiving unit 2200 provides the application information to the mobile terminal 1000 via NFC, the application information receiving unit 2200 may provide link information for downloading the application installation file to the mobile terminal 1000. Also, when the application information receiving unit 2200 provides the application information to the mobile terminal 1000 via communication means other than NFC, the application information receiving unit 2200 may provide the application installation file to the mobile terminal 1000.

Also, the application information receiving unit 2200 may provide the application information about the application suitable for the mobile terminal 1000 to the mobile terminal 1000. The application information receiving unit 2200 may provide the application information about the application suitable for the OS installed in the mobile terminal 1000 to the mobile terminal 1000 based on the terminal information. Also, the application information receiving unit 2200 may provide the application information about the application suitable for a specification of the mobile terminal 1000 based on the terminal information.

The goods confirming unit 2300 confirms the goods contained in the shopping cart. The goods confirming unit 2300 may confirm the goods contained in the shopping cart by receiving the information about the goods from the tags attached to the goods. For example, when the user brings the goods to be purchased toward the store terminal 2000, the goods confirming unit 2300 may receive the information about the goods from the tags attached to the goods by using NFC readers via NFC.

Also, the goods confirming unit 2300 may confirm the goods contained in the shopping cart by using the plurality of sensors and NFC readers located on the shopping cart. In this case, the plurality of sensors and NFC readers may be uniformly located on the shopping cart, and may obtain the information about the goods contained in the shopping cart. Also, the goods confirming unit 2300 may confirm the goods contained in the shopping cart from the information obtained by the plurality of sensors and NFC readers.

The goods list providing unit 2400 provides the goods list of the confirmed goods to the mobile terminal 1000. As the mobile terminal 1000 approaches the store terminal 2000, the goods list providing unit 2400 may provide the goods list of the confirmed goods to the mobile terminal 1000, but the present embodiment is not limited thereto. The goods list providing unit 2400 may provide the goods list of the goods confirmed by the mobile terminal 1000 via other communication means. Also, the goods list of the goods contained in the shopping cart may be updated in real time, and the goods list providing unit 2400 may provide the updated goods list to the mobile terminal 1000. Also, the goods list providing unit 2400 may provide the goods list of the confirmed goods to the server 3000.

The right changing unit 2500 changes the right to pass the gate. The right changing unit 2500 may compare a goods list of the goods that are paid for by the server 3000 with the goods list of the goods confirmed by the store terminal 2000, and may change the right to pass the gate when the goods list of the goods that are paid for by the server 3000 and the goods list of the goods confirmed by the store terminal 2000 are the same. When the right to pass the gate of the store terminal 2000 is changed to 'permission', the store terminal 2000 may pass the gate of the store.

When goods are newly contained in the shopping cart of the user after payment completion information is received, the goods list of the goods that are paid for by the server 300 and the goods list of the goods confirmed by the store terminal 2000 are different from each other. In this case, the right changing unit 2500 may re-change the right to pass the gate to 'rejection'.

The DB 2600 stores various pieces of information needed for the store terminal 2000 to provide the goods list of the goods contained in the shopping cart to the mobile terminal 1000 and the server 3000 and needed to change the right to pass the gate of the store as the goods are paid for.

The transmitting/receiving unit 2700 transmits/receives to/from the mobile terminal and the server 3000 the various pieces of information needed for the store terminal 2000 to provide the goods list of the goods contained in the shopping cart to the mobile terminal 1000 and the server 3000 and needed to change the right to pass the gate of the store as the goods are paid for.

The control unit 2800 controls the terminal information receiving unit 2100, the application information receiving unit 2200, the goods confirming unit 2300, the goods list providing unit 2400, the right changing unit 2500, the DB 2600, and the transmitting/receiving unit 2700, so that the store terminal 2000 provides the goods list of the goods contained in the shopping cart to the mobile terminal 1000 and the server 3000, and the right to pass the gate of the store is changed as the goods are paid for.

Figure 16:
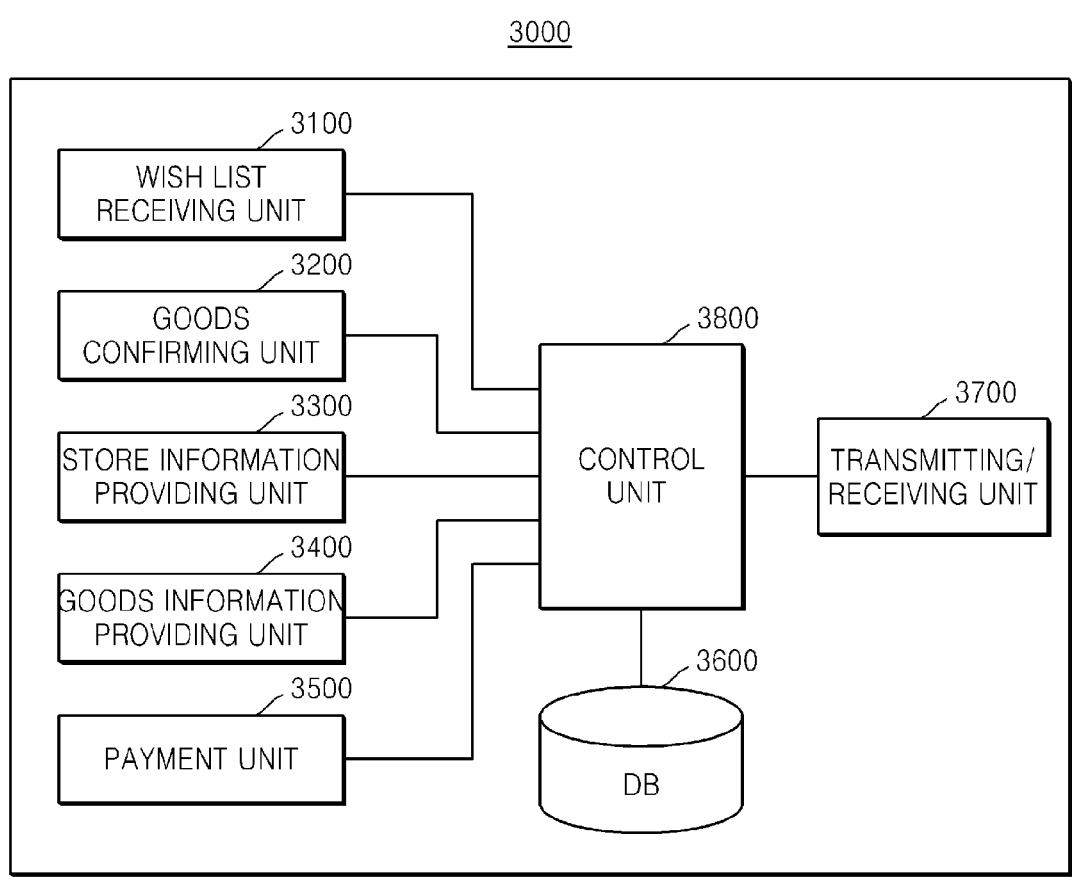
FIG. 16 is a block diagram illustrating a server according to an exemplary embodiment.

FIG. 16 is a block diagram illustrating a server 3000 according to an exemplary embodiment.

Referring to FIG. 16, the server 3000 includes a wish list receiving unit 3100, a goods confirming unit 3200, a store information providing unit 3300, a goods information providing unit 3400, a payment unit 3500, a DB 3600, a transmitting/receiving unit 3700, and a control unit 3800.

The wish list receiving unit 3100 receives the wish list of the user for the goods from the store terminal 2000 or the mobile terminal 1000.

The goods confirming unit 3200 confirms the goods included in the wish list and the goods contained in the shopping cart. The goods confirming unit 3200 may receive the goods list of the goods contained in the shopping cart from the store terminal 2000, and may distinguish the goods not included in the shopping cart from among the goods included in the wish list.

The store information providing unit 3300 provides store map information to the mobile terminal 1000. The store map information may include store map data and information about where the goods are located in the store, but the present embodiment is not limited thereto.

The goods information providing unit 3400 provides the information about the goods to the mobile terminal 1000. The goods information providing unit 3400 may provide the information about the goods included in the wish list and the information about the goods confirmed by the store terminal 2000 to the mobile terminal 1000. Also, the goods information providing unit 3400 may provide to the mobile terminal 1000 information about the goods not included in the goods list of the goods confirmed by the store terminal 2000 from among the goods included in the wish list. The information about the goods may include location information of the goods, and the location information of the goods may include, for example, coordinate values on the store map, but the present embodiment is not limited thereto. Also, the information about the goods may include detailed information of the goods. The detailed information of the goods may include, for example, information about names, brands, and prices of the goods, and the location information of the goods. Also, the information about the goods may include event information about the goods. The event information about the goods may include, for example, discount information and coupon information, but the present embodiment is not limited thereto.

The payment unit 3500 pays for the goods that the user is to purchase. The payment unit 3500 may compare the purchase list received from the store terminal 2000 with the purchase list received from the mobile terminal 1000, and may pay for the goods when the purchase list received from the store terminal 2000 and the purchase list received from the mobile terminal 1000 are the same.

Also, the payment unit 3500 may provide payment completion information to the mobile terminal 1000 and the store terminal 2000. The payment completion information may include a goods list of the goods that are paid for and a notice message indicating that the goods are paid for, but the present embodiment is not limited thereto.

The DB 3600 stores various pieces of information needed for the server 3000 to provide the information about the goods included in the wish list and the goods contained in the shopping cart to the mobile terminal 1000 and process payment of the goods that the user is to purchase.

The transmitting/receiving unit 3700 transmits/receives to/from the store terminal 2000 and the mobile terminal 1000 the various pieces of information needed for the server 3000 to provide the information about the goods included in the wish list and the goods contained in the shopping cart to the mobile terminal 1000 and process payment of the goods that the user is to purchase.

The control unit 3800 controls an overall operation of the server 3000, and controls the wish list receiving unit 3100, the goods confirming unit 3200, the store information providing unit 3300, the goods information providing unit 3400, the payment unit 3500, the DB 3600, and the transmitting/receiving unit 3700 so that the server 3000 provides the information about the goods included in the wish list and the goods contained in the shopping cart to the mobile terminal 1000 and pays for the goods that the user is to purchase.

The one or more exemplary embodiments may be embodied as a recording medium, e.g., a program module to be executed in computers, which include computer-readable commands. The computer storage medium may include any usable medium that may be accessed by computers, volatile and non-volatile media, and detachable and non-detachable media. Also, the computer storage medium may include a computer storage medium and a communication medium. The computer storage medium includes all of volatile and non-volatile media, and detachable and non-detachable media which are designed to store information including computer-readable commands, data structures, program modules, or other data. The communication medium includes computer-readable commands, a data structure, a program module, and other transmission mechanisms, and includes other information transmission media.

While the present invention has been particularly shown and described with reference to exemplary embodiments thereof, it will be understood by one of ordinary skill in the art that various changes in form and details may be made therein without departing from the spirit and scope of the present invention as defined by the following claims. Hence, it will be understood that the embodiments described above are not limiting of the scope of the invention. For example, each component described in a single type may be executed in a distributed manner, and components described distributed may also be executed in an integrated form.

The scope of the present invention is indicated by the claims rather than by the detailed description of the invention, and it should be understood that the claims and all modifications or modified forms drawn from the concept of the claims are included in the scope of the present invention.

What is claimed is:

1. A method performed by a mobile terminal to receive information about goods, the method comprising:
    initiating, by the mobile terminal, a connection via near field communication (NFC) with a store terminal attached to a shopping cart when the mobile terminal is within a predetermined distance from the store terminal attached to the shopping cart;
    in response to initiating the connection, providing, by the mobile terminal via NFC, terminal information of the mobile terminal to the store terminal attached to the shopping cart, the terminal information of the mobile terminal including a type of operating system (OS) installed in the mobile terminal;
    receiving, by the mobile terminal, information about an application for using a service provided by a store from the store terminal attached to the shopping cart via NFC;
    installing, in the mobile terminal, the application for using the service provided by the store based on the information about the application received from the store terminal attached to the shopping cart, wherein the information about the application comprises at least one of an application installation file and link information for downloading the application installation file;
    storing, in the mobile terminal, a first list of goods;
    providing, by the mobile terminal, the first list of goods to the store terminal attached to the shopping cart via NFC:
    receiving, by the mobile terminal, connection information about a server of the store from the store terminal attached to the shopping cart via NFC and providing, by the mobile terminal, the terminal information of the mobile terminal and the first list of goods to the server of the store based on the connection information about the server;
    receiving, by the mobile terminal using the installed application, from the store terminal attached to the shopping cart, a second list of the goods confirmed by the store terminal attached to the shopping cart via NFC;
    providing, by the mobile terminal, the second list of goods confirmed by and received from the store terminal attached to the shopping cart to the server of the store;
    comparing, by using the installed application, the goods included in the first list stored in the mobile terminal and the goods included in the second list received from the store terminal attached to the shopping cart;
    distinctively displaying, on a screen of the mobile terminal by using the installed application, the goods included in the stored first list and the goods included in the second list based on the comparison;
    displaying, on the screen of the mobile terminal, a store map;
    displaying, on the store map, a plurality of goods included in the first list that are not included in the second list;
    receiving a user selection of one or more goods of the plurality of goods;
    in response to the user selection of the one or more goods of the plurality of goods displayed on the store map, displaying one or more item options of the one or more goods of the plurality of goods on the store map;
    receiving event information about the one or more goods of the plurality of goods displayed on the store map from the server;
    in response to receiving the event information about the one or more goods, displaying the event information on the store map;
    receiving, by the mobile terminal using the installed application, from the store terminal attached to the shopping cart, an updated list of one or more goods confirmed by the store terminal attached to the shopping cart via NFC;
    updating, by the mobile terminal, the store map displayed on the screen according to the updated list of one or more goods; and
    displaying, on the screen of the mobile terminal, the updated store map;
    wherein the goods listed on the second list are confirmed by the store terminal attached to the shopping cart to be contained in the shopping cart.

2. The method of claim 1, further comprising:
receiving, from the server of the store, location information about locations in the store of the goods included in the first list.

3. The method of claim 2, wherein the displaying of the goods further comprises: distinctively displaying, on the store map, the goods included in the second list from the goods included in the first list.

4. The method of claim 2, wherein the location information comprises information about goods included in the first list that are not confirmed by the store terminal attached to the shopping cart.

5. The method of claim 1, wherein the store terminal attached to the shopping cart confirms the goods contained in the shopping cart by using a plurality of near field communication (NFC) tags included in the shopping cart.

6. The method of claim 1, further comprising:
requesting the server of the store to process payment of the goods included in the second list,
wherein payment completion information indicating that the goods in the second list are paid for is provided to the store terminal in response to the goods being paid.

7. The method of claim 6, wherein the payment completion information is used by the store terminal attached to the shopping cart to pass a gate of the store.

8. The method of claim 1, wherein displaying goods included in the stored first list and goods included in the second list further comprises:
displaying the first list of goods;
determining corresponding goods by comparing the first list of goods and the second list of goods; said determining occurring automatically by detection of presence of items in the first list of goods in the shopping cart using a near field sensor; and
displaying a check next to corresponding goods shown in the displayed first list of goods.

9. A mobile terminal comprising:
a storage;
a transmitting and receiving unit;
a display screen;
a processor; and
a memory including instructions executable by the processor, that, when executed by the processor, causes the mobile terminal to:
initiate a connection via near field communication (NFC) with a store terminal attached to a shopping cart when the mobile terminal is within a predetermined distance from the store terminal attached to the shopping cart;
in response to initiating the connection, provide, via NFC, terminal information of the mobile terminal to the store terminal attached to the shopping cart, the terminal information of the mobile terminal including a type of operating system (OS) installed in the mobile terminal;
receive information about an application for using a service provided by a store from the store terminal attached to the shopping cart via NFC;
install the application for using the service provided by the store based on the information about the application received from the store terminal attached to the shopping cart, wherein the information about the application comprises at least one of an application installation file and link information for downloading the application installation file;
store, in the storage, a first list of goods;
provide, via the transmitting and receiving unit, the first list of goods to the store terminal attached to the shopping cart via NFC;
receive connection information about a server of the store from the store terminal attached to the shopping cart via NFC and provide the terminal information of the mobile terminal and the first list of goods to the server of the store based on the connection information about the server;
receive, from the store terminal attached to the shopping cart, by using the installed application, a second list of goods confirmed by the store terminal attached to the shopping cart via NFC;
provide the second list of goods confirmed by and received from the store terminal attached to the shopping cart to the server of the store;
compare, by using the installed application, the goods included in the first list stored in the mobile terminal and the goods included in the second list received from the store terminal attached to the shopping cart;
distinctively display, on the display screen by using the installed application, the goods included in the first list and the goods included in the second list based on the comparison;
display, on the display screen, a store map;
display, on the store map, a plurality of goods included in the first list that are not included in the second list;
receive a user selection of one or more goods of the plurality of goods;
in response to the user selection of the one or more goods of the plurality of goods displayed on the store map, display one or more item options of the one or more goods of the plurality of goods on the store map;
receive event information about the one or more goods of the plurality of goods displayed on the store map from the server;
in response to receiving the event information about the one or more goods, display the event information on the store map;
receive, using the installed application, from the store terminal attached to the shopping cart, an updated list of one or more goods confirmed by the store terminal attached to the shopping cart via NFC;
update the store map displayed on the display screen according to the updated list of one or more goods; and
display, on the display screen, the updated store map;
wherein the goods listed on the second list are confirmed by the store terminal attached to the shopping cart to be contained in the shopping cart.

10. The mobile terminal of claim 9, wherein the instructions further comprise receiving, by the transmitting and receiving unit, from the server of the store, location information about locations of the goods included in the first list in the store.

11. The mobile terminal of claim 10, wherein the instructions further comprise distinctively display, on the store map, the goods included in the second list from the goods included in the first list.

12. The mobile terminal of claim 10, wherein the location information comprises information about goods included in the first list that are not confirmed by the store terminal attached to the shopping cart.

13. The mobile terminal of claim 12, wherein the second list of the goods confirmed by the store terminal is provided by the store terminal to the server.

14. The mobile terminal of claim 9, wherein the store terminal attached to the shopping cart is configured to confirm the goods contained in the shopping cart by using a plurality of near field communication (NFC) tags included in the shopping cart.

15. The mobile terminal of claim 9, further comprising: a payment unit configured to request the server of the store to process payment of the goods included in the second list, wherein payment completion information indicating that the goods in the second list are paid for is provided to the store terminal attached to the shopping cart in response to the goods being paid.

16. The mobile terminal of claim 15, wherein the payment completion information is used by the store terminal attached to the shopping cart to pass a gate of the store.

17. A non-transitory computer readable medium having recorded thereon a computer program that is executable by a computer to perform a method performed by a mobile terminal to receive information about goods, the method comprising:
- initiating, by the mobile terminal, a connection via near field communication (NFC) with a store terminal attached to a shopping cart when the mobile terminal is within a predetermined distance from the store terminal attached to the shopping cart;
- in response to initiating the connection, providing, by the mobile terminal via NFC terminal information of the mobile terminal to the store terminal attached to the shopping cart, the terminal information of the mobile terminal including a type of operating system (OS) installed in the mobile terminal;
- receiving, by the mobile terminal, information about an application for using a service provided by a store from the store terminal attached to the shopping cart via NFC
- installing, in the mobile terminal, the application for using the service provided by the store based on the information about the application received from the store terminal attached to the shopping cart, wherein the information about the application comprises at least one of an application installation file and link information for downloading the application installation file;
- storing, in the mobile terminal, a first list of goods;
- providing, by the mobile terminal, the first list of goods to the store terminal attached to the shopping cart via NFC;
- receiving, by the mobile terminal, connection information about a server of the store from the store terminal attached to the shopping cart via NFC and providing, by the mobile terminal, the terminal information of the mobile terminal and the first list of goods to the server of the store based on the connection information about the server;
- receiving, by the mobile terminal using the installed application, from the store terminal attached to the shopping cart, a second list of goods confirmed by the store terminal attached to the shopping cart via NFC;
- providing, by the mobile terminal, the second list of goods confirmed by and received from the store terminal attached to the shopping cart to the server of the store;
- comparing, by using the installed application, the goods included in the first list stored in the mobile terminal and the goods included in the second list received from the store terminal attached to the shopping cart;
- distinctively displaying, on a screen of the mobile terminal by using the installed application, the goods included in the stored first list and the goods included in the second list based on the comparison;
- displaying, on the screen of the mobile terminal, a store map;
- displaying, on the store map, a plurality of goods included in the first list that are not included in the second list;
- receiving a user selection of one or more goods of the plurality of goods;
- in response to the user selection of the en-one or more goods of the plurality of goods displayed on the store map, displaying one or more item options of the one or more goods of the plurality of goods on the store map;
- receiving event information about the one or more goods of the plurality of goods displayed on the store map from the server;
- in response to receiving the event information about the one or more goods, displaying the event information on the store map;
- receiving, by the mobile terminal using the installed application, from the store terminal attached to the shopping cart, an updated list of one or more goods confirmed by the store terminal attached to the shopping cart via NFC;
- updating, by the mobile terminal, the store map displayed on the screen according to the updated list of one or more goods; and
- displaying, on the screen of the mobile terminal, the updated store map;
- wherein the goods listed on the second list are confirmed by the store terminal attached to the shopping cart to be contained in the shopping cart.

* * * * *